(12) United States Patent
Kojima et al.

(10) Patent No.: US 7,228,322 B1
(45) Date of Patent: Jun. 5, 2007

(54) DATA MANAGEMENT APPARATUS OF SWITCHING SYSTEM

(75) Inventors: Katsue Kojima, Yokohama (JP); Yasuhiro Uchida, Yokohama (JP); Munehiro Date, Yokohama (JP); Toshiyuki Akita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 09/668,995

(22) Filed: Sep. 25, 2000

(30) Foreign Application Priority Data

Nov. 17, 1999 (JP) ................................. 11-327483

(51) Int. Cl.
G06F 12/00 (2006.01)
G06F 17/30 (2006.01)
(52) U.S. Cl. .................... 707/205; 707/206; 707/104.1
(58) Field of Classification Search ................ 707/1–4, 707/10, 200–204
See application file for complete search history.

(56) References Cited

U.S. PATENT DOCUMENTS

| | | | | |
|---|---|---|---|---|
| 4,755,939 A | * | 7/1988 | Watson ........................ | 707/206 |
| 5,021,946 A | * | 6/1991 | Korty ........................... | 707/205 |
| 5,095,420 A | * | 3/1992 | Eilert et al. ................... | 711/209 |
| 5,175,852 A | * | 12/1992 | Johnson et al. ................. | 707/8 |
| 5,502,836 A | * | 3/1996 | Hale et al. .................... | 711/170 |
| 5,561,785 A | | 10/1996 | Blandy et al. ............... | 711/170 |
| 5,751,979 A | * | 5/1998 | McCrory ...................... | 345/803 |
| 5,787,442 A | * | 7/1998 | Hacherl et al. .............. | 707/201 |
| 5,799,314 A | * | 8/1998 | Provino et al. .............. | 709/230 |
| 5,806,058 A | * | 9/1998 | Mori et al. ..................... | 707/2 |
| 5,819,292 A | * | 10/1998 | Hitz et al. .................... | 707/203 |
| 5,832,491 A | * | 11/1998 | Tatsumi et al. .............. | 707/101 |
| 6,029,160 A | * | 2/2000 | Cabrera et al. ................. | 707/1 |
| 6,044,378 A | * | 3/2000 | Gladney .................. | 707/103 R |
| 6,199,203 B1 | * | 3/2001 | Saboff ......................... | 717/168 |
| 6,304,912 B1 | * | 10/2001 | Oguchi et al. .............. | 709/238 |
| 6,360,220 B1 | * | 3/2002 | Forin ............................. | 707/8 |
| 6,397,311 B1 | * | 5/2002 | Capps ......................... | 711/165 |
| 6,449,623 B1 | * | 9/2002 | Bohannon et al. .......... | 707/202 |
| 6,516,329 B1 | * | 2/2003 | Smith ....................... | 715/501.1 |

(Continued)

FOREIGN PATENT DOCUMENTS

JP                3-50651         3/1991

(Continued)

OTHER PUBLICATIONS

Jodeit, J.G. "Storage Organization in Programming Systems", Communications of the ACM, vol. 11, No. 11, pp. 741-746, Nov. 1968.*

(Continued)

*Primary Examiner*—Luke S Wassum
(74) *Attorney, Agent, or Firm*—Katten Muchin Rosenman LLP

(57) ABSTRACT

A data management apparatus, according to a request of an application program, lends a pointer for reading out a data from a data field stored a plurality of data. An address of the data field corresponding to the lent pointer is stored a lending pointer table. When the application program accesses a data stored in the data field, the data management apparatus receives the pointer from the application program, reads out an address corresponding to the received pointer from the lending pointer table, and reads out the data corresponding to the read address from the data field. The read data is given to the application program.

15 Claims, 22 Drawing Sheets

U.S. PATENT DOCUMENTS 6,581,060 B1 * 6/2003 Choy ........................... 707/9

FOREIGN PATENT DOCUMENTS

| JP | 6-214874 | | 8/1994 |
|---|---|---|---|
| JP | 07295814 A | * | 11/1995 |
| JP | 5-229599 | | 10/1996 |
| JP | 10275082 A | * | 10/1998 |
| JP | 2001005704 A | * | 1/2001 |

OTHER PUBLICATIONS

Ben-Amram, A.M. and Z. Galil "On Pointers Versus Addresses", Journal of the ACM, vol. 39, No. 3, pp. 617-648, Jun. 1992.*

Buhr, P.A., A.K. Goel, N. Nishimura and P. Ragde "Database: Parallelism in a Memory-Mapped Environment", Proceedings o the ACM Symposium on Parallel Algorithms and Architectures, pp. 196-199, Jun. 1996.*

* cited by examiner

LENDING POINTER TABLE 15

M PIECES OF POINTER RECORD

| RECORD ADDRESS | DATA FIELD POINTER | DATA STORAGE AREA SIZE | APPLICATION ENTRY ADDRESS | STATUS OF USE (USE CONDITION) |
|---|---|---|---|---|
| tbl-1 | adr_1 | size-2 | apl-1 | NOT USED |
| tbl-2 | adr_2 | size-3 | apl-2 | BEING READ |
| tbl-3 | adr_3 | size-1 | apl-3 | NOT USED |

DATA SETTING AREA MANAGEMENT TABLE (16)

| STATUS OF USE OF ENTIRE DATA FIELD | | BEGINNING ADDRESS OF ALLOCATION AND RELEASE FIELD | FINAL (ENDING) ADDRESS OF FIXED FIELD |
|---|---|---|---|
| SIZE OF USE | EMPTY SIZE | adr_free | adr_fix |
| n | m | | |

⎫ SIZE OF USE AND EMPTY SIZE OF ENTIRE DATA FIELD

MINIMUM ADDRESS OF EACH SIZE OF CONTINUOUS EMPTY AREAS

| SIZE | MINIMUM ADDRESS | ALLOCATION AND RELEASE OCCURRENCE FREQUENCY STATISTIC DATA |
|---|---|---|
| size 1 | adr_4 | n TIMES |
| size 2 | adr_m | 0 TIME |
| ⋮ | ⋮ | |
| size 3 | adr_n | m TIMES |

⎫ CONTINUOUS SIZE OF UNUSED DATA SETTING AREA, ITS MIN. ADDRESS, AND ALLOCATION OR RELEASE OCCURRENCE FREQUENCY OF EACH SIZE

STATUS OF USE (USE CONDITION) IN EACH DATA SETTING AREA

| ADDRESS | STATUS OF USE | LINK INFORMATION BETWEEN DATA SETTING AREAS | RELOCATION STATUS |
|---|---|---|---|
| adr_1 | BEING USED | ADR_1 CONTINUOUS | |
| adr_2 | BEING USED | adr_p-2 | |
| adr_3 | BEING USED | | |
| adr_4 | EMPTY | | adr_4 |
| adr_5 | EMPTY | | |
| adr_6 | BEING USED | adr_p-1 | |
| adr_7 | BEING USED | adr_6 CONTINUOUS | |
| adr_8 | BEING USED | | |
| ⋮ | ⋮ | | |
| adr_x | BEING USED | adr_p-3 | |

⎫ STATUS OF USE AND STATUS OF RELOCATION PROCESS ARE MANAGED IN EVERY SIZE OF DATA SETTING AREA IN THE ENTIRE DATA FIELD

\* DATA SETTING AREA IS THE MIN. UNIT OF ALLOCATION AND RELEASE FOR SETTING DATA BY DIVIDING THE ENTIRE DATA FIELD BY A SPECIFIC SIZE.

FIG. 6A

DATA SETTING AREA MANAGEMENT TABLE 16

| STATUS OF USE OF ENTIRE DATA FIELD | | BEGINNING ADDRESS OF ALLOCATION AND RELEASE FIELD | FINAL (ENDING) ADDRESS OF FIXED FIELD |
|---|---|---|---|
| SIZE OF USE | EMPTY SIZE | | |
| n | m | adr_11 | adr_n-5 |
| MINIMUM ADDRESS OF EACH SIZE OF CONTINUOUS EMPTY AREAS | | ALLOCATION AND RELEASE OCCURRENCE FREQUENCY STATISTIC DATA | |
| SIZE | MINIMUM ADDRESS | | |
| 1 | adr_8 | 1 TIME | |
| 2 | adr_4 | 2 TIMES | |
| STATUS OF USE (USE CONDITION) IN EACH DATA SETTING AREA | | LINK INFORMATION BETWEEN DATA SETTING AREAS | RELOCATION STATUS (RELOCATION CONDITION) |
| ADDRESS | STATUS OF USE | | |
| adr_1 | BEING USED | | |
| adr_2 | BEING USED | adr_1 CONTINUOUS | |
| adr_3 | BEING USED | | |
| adr_4 | EMPTY | | |
| adr_5 | EMPTY | | |
| adr_6 | BEING USED | adr_1 | |
| adr_7 | BEING USED | adr_6 CONTINUOUS | |
| adr_8 | EMPTY | | |
| ⋮ | ⋮ | | |
| adr_n | BEING USED | adr_9 | |

FIG. 6B

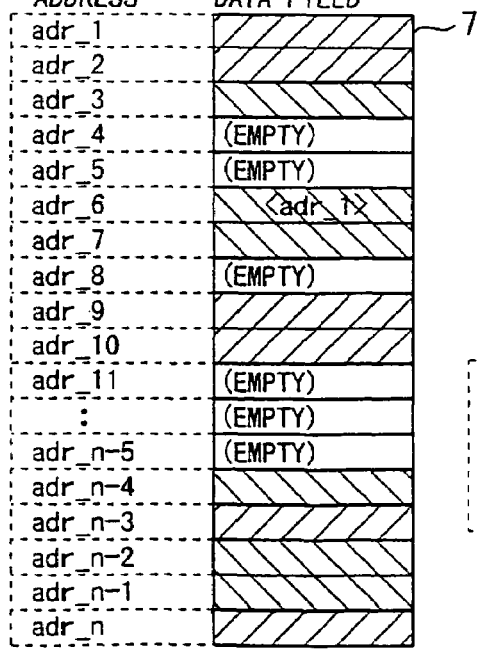

COMPOSITION OF DATA FIELD

LEGEND
- ONE DATA SETTING AREA
- DATA STORAGE AREA (BEING USED)
- <LINK DESTINATION ADDRESS>

FIG. 13A

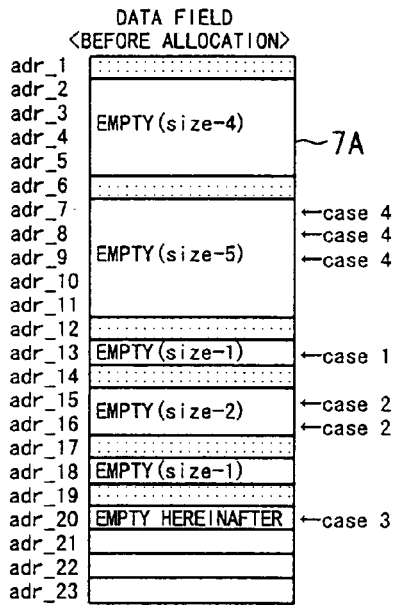

DATA FIELD <BEFORE ALLOCATION>

| Address | Content | |
|---|---|---|
| adr_1 | | |
| adr_2 | EMPTY(size-4) | |
| adr_3 | | ~7A |
| adr_4 | | |
| adr_5 | | |
| adr_6 | | |
| adr_7 | | ←case 4 |
| adr_8 | EMPTY(size-5) | ←case 4 |
| adr_9 | | ←case 4 |
| adr_10 | | |
| adr_11 | | |
| adr_12 | | |
| adr_13 | EMPTY(size-1) | ←case 1 |
| adr_14 | | |
| adr_15 | EMPTY(size-2) | ←case 2 |
| adr_16 | | ←case 2 |
| adr_17 | | |
| adr_18 | EMPTY(size-1) | |
| adr_19 | | |
| adr_20 | EMPTY HEREINAFTER | ←case 3 |
| adr_21 | | |
| adr_22 | | |
| adr_23 | | |

FIG. 13B

DATA SETTING AREA MANAGEMENT TABLE <BEFORE ALLOCATION>   16

| STATUS OF USE OF ENTIRE DATA FIELD | | BEGINNING ADDRESS OF ALLOCATION AND RELEASE FIELD | FINAL ADDRESS OF FIXED FIELD |
|---|---|---|---|
| SIZE OF USE | EMPTY SIZE | | |
| n | m | adr_20 | adr_fix |
| MINIMUM ADDRESS OF EACH SIZE OF CONTINUOUS EMPTY AREAS | | ALLOCATION AND RELEASE OCCURRENCE FREQUENCY STATISTIC DATA | |
| SIZE | MIN. ADDRESS | | |
| size 1 | adr_13 | 10 | |
| size 2 | adr_15 | 20 | |
| size 4 | adr_2 | 2 | |
| size 5 | adr_7 | 2 | |
| STATUS OF USE OF EACH DATA SETTING AREA | | LINK INFORMATION BETWEEN AREAS | RELOCATION STATUS |
| ADDRESS | STATUS OF USE | | |

CHANGED AS FOLLOWS DEPENDING ON CASES 1 TO 4

FIG. 13C

| CASE No. | STATE | ALLOCATION TARGET AREA (DATA STORAGE AREA FOR ALLOCATING DATA) | | MINIMUM ADDRESS OF EACH SIZE OF CONTINUOUS EMPTY AREAS (CHANGE CONTENT) | | BEGINNING ADDRESS OF ALLOCATION AND RELEASE FIELD |
|---|---|---|---|---|---|---|
| | | ADDRESS | SIZE | SIZE | MIN. ADDRESS | |
| 0 | INITIAL STATE | | | size-1 | adr_13 | adr_20 |
| | | | | size-2 | adr_15 | |
| | | | | size-4 | adr_2 | |
| | | | | size-5 | adr_7 | |
| 1 | ALLOCATION AT MIN. ADDRESS POSITION | adr_13 | size-1 | size-1 | adr_18 (CHANGED) | |
| 2 | ALLOCATION AT MIN. ADDRESS POSITION | adr_15 | size-2 | size-2 | (DELETED) | |
| 3 | ALLOCATION OF DATA HAVING LARGER SIZE THAN SIZE OF CONTINUOUS EMPTY AREAS IN DATA FIELD | adr_20 | size-7 | size-7 | adr_20 (ADDED) | adr_27 (CHANGED) |
| 4 | ALLOCATION OF DATA HAVING SIZE "NOT FOUND CONTINUOUS EMPTY AREA HAVING SAME SIZE IN DATA FIELD" AND "SMALLER THAN SIZE OF CONTINUOUS EMPTY AREAS IN DATA FIELD" (*) | adr_7 | size-3 | size-3 | adr_7 (ADDED) | |
| | | | | size-2 | adr_10 (CHANGED) | |
| | | | | adr_5 | (DELETED) | |

EMPTY COLUMN SHOWS NO CHANGE

*THE AREA OF SIZE-3 CAN BE ALLOCATED BOTH FROM ADR_2 OF SIZE-4 AND FROM ADR_7 OF SIZE-5
WHEN ALLOCATED IN SIZE-4 : NEW EMPTY REGION SIZE IS SIZE-1
WHEN ALLOCATED IN SIZE-5 : NEW EMPTY REGION SIZE IS SIZE-2
HEREIN, ACCORDING TO THE VALUE IN THE "FREQUENCY STATISTIC DATA", SINCE THE NUMBER OF TIMES OF SIZE-1 < NUMBER OF TIMES OF SIZE-2, IT IS KNOWN MORE EFFECTIVE TO UTILIZE THE DATA FIELD BY OBTAINING SIZE-2, AND IT IS ALLOCATED IN ADR_7

DATA MANAGEMENT APPARATUS OF SWITCHING SYSTEM

BACKGROUND OF THE INVENTION

1. Field of the Invention

The present invention relates to a data management apparatus of switching system for managing data used by an application program for executing service about communication.

2. Description of the Related Art

Service about communication (for example, exchange service) is realized when an application program mounted on an switching unit for composing an switching system is executed by a CPU or a processor. The data used in the application program is saved in a data field created in a main memory or the like of the switching unit, and the data stored in the data field is managed by a data management module.

Recently, as the communication market is being opened, the competition among communication operators is intensified, and the operators have been trying to expand the share by discriminating or diversifying the service to be presented to the subscribers. Along with the discrimination or diversification of the service, the function and performance of the application program for presenting the service are sophisticated, and the variety and size of the data used in the application program are expanding. Accordingly, the data management module mounted on the switching unit is required to have the following features.

(1) The data management module should execute allocation and/or release of data in the data field during operation of the switching unit.

(2) The data management module should relocate the data stored in the data field, and avoid scattering of unused areas caused in the data field by repetition of allocation and/or release of data.

In order to realize the requirements of (1) and (2), the data management module is required not to exert effects on the performance and quality of the application program (for example, data reading of application program).

Hitherto, by adopting the following method, it has been attempted to enhance the performance of the data access by the application program, and assure the quality of the data being read out.

As shown in FIG. 18, the switching unit comprises a main memory and a hard disk in order to enhance the performance of exchange service processing, and the data necessary for exchange service (for example, exchange office's unique data) is saved in the data field provided in the main memory, while the hard disk stores the backup data of the data held the data field in the main memory.

The data management module updates the content of the data held in the data field whenever according to the request from the application program. As a result, the application program can read out the latest data from the main memory.

The data management module synchronizes the held content in the main memory and the held content in the hard disk. Hence, the quality of the data being read out from the data field is assured. On the other hand, in the case the switching unit is down, when by restarting of the switching unit, the content of the data being read out from the hard disk to the main memory is guaranteed.

As shown in FIG. 19. since the data field of the main memory stores data in a large quantity and in a wide variety, it has a multi-stage tree structure. Further, in consideration of enhancement of performance of reading out data from this data field, a data link using a direct address is built up.

When the data is read out from the data field shown in FIG. 19, as shown in FIG. 20, the data field is searched with an index value specified from the application program, and the searched data is given to the application program.

Further, when there is a specific data accessed repeatedly by the application program in the data field, as shown in FIG. 21, the data management module gives the direct address (pointer) of the specific data to the application program according the request from the application program. The application program informs the data management module of the pointer when reading out the specific data. The data management module directly accesses the specific data by using this pointer. As a result, the redundant processing of searching data every time by using the index value is omitted, and the data reading performance is improved. FIG. 22 is a composition diagram of the conventional data management module.

On the other hand, in order to assure the quality of the data held in the data field, that is, to avoid racing between data reading from the data field by the application program and maintenance and operating service of the data management module for adding, updating and deleting data in the data field, the following prior arts have been known.

(1) Racing control method by information (data identifier, address, etc.) for identifying the data (racing control).

(2) Method of preparing a first data field to be accessed by the application program and a second data field to be accessed by the data management module and storing the same data that is stored in the first data field (data field separation).

(3) Method of preparing a first data field to be accessed by the application program and a second data field to be accessed by data management module and storing the same data that is stored in the first data field. If the second data field is updated, thereafter, when the application program does not access to the first data field, the first data field is similarly updated (data updating time adjustment).

The switching system is required to present the maintenance and operating service to the data field by the data management module, without exerting effects on the performance and quality of the application program. The data management module, when managing the data field, allocates or releases the data dynamically in the case of adding or deleting data in or from the data field. Such data management module relocates the data in order to utilize the data field effectively.

In the conventional methods, however, the following problems have been known. First, in the prior art shown in FIG. 21, the data management module merely gives the pointer value to the application program according to the request from the application program, and does not have the function of managing the pointer value. Accordingly, if the data management module relocates the data in the data field and the content of the data in the address corresponding to the pointer given to the application program is changed, the application program cannot read out the desired data by using the pointer. As a result, the application program may malfunction. Therefore, the data management module has been required to have the function of managing the pointer to be given to the application program.

In the direct address link system shown in FIG. 19, when a data is stored in plural areas in the data field so as to range between the plural areas, and part of the stored data is relocated, the link is cut off between part of data being relocated and part of data not relocated. Accordingly, the part of data not relocated is detected, and a new link must be formed with the part of relocated data. However, since the data field in the main memory is large in capacity and it takes a lot of time to search and change the data, adverse effects may occur in the data reading quality of the application program. It has been hence required to match the link following data relocation in a short time.

In the management system of the data field shown in FIG. 18, the data field on the hard disk must be synchronized according to the relocation of data of the data field on the main memory. The conventional disk feedback function for feeding back the changed data on the main memory to the hard disk shown in FIG. 18 has a function of absorbing the difference in the processing speed of data access on the main memory and disk access.

However, in the management system in FIG. 18, in addition to the disk feedback data relating to the data change by request from the application program, the disk feedback data relating to the relocation occurs in a large quantity. As a result, the contents are not matched between the main memory and the hard disk, and such system unstable state may continue for a long period. It has been hence required to minimize the disk feedback amount, that is, the relocated data quantity.

Further, when the above-mentioned racing control is executed, the performance may be lowered due to operation restriction of the maintenance and operating service. When the above-mentioned data field separation is executed, it requires measures for expansion of the first and second data fields and data matching between the first data field and the second data field. Also when the above-mentioned data updating time adjustment is executed, it requires measures for expansion of the first and second data fields, and assurance of quality of data being read out at an intermediate interval of data updating timing. These methods are, therefore, inappropriate as the configuration for operating by synchronizing between the main memory and the hard disk without causing adverse effects mutually between the application program and the data management module.

SUMMARY OF THE INVENTION

It is hence an object of the invention to present a data management apparatus of switching system capable of managing the data used by an application program without exerting effects on the execution of the application program.

The invention is a data management apparatus for managing a plurality of data which are used in order to execute at least one of application programs for providing services related to communication by a switching system. The data management apparatus comprises a data field storing the plurality of data, an address acquirer acquiring an address of the data in the data field for which an access is requested by the application program, a lending pointer table storing at least one of pointer records having the acquired address and a pointer corresponding to the acquired address and a lender reading out the pointer from said lending pointer table and lending the read pointer to the application program.

The invention may be further comprise a reader receiving the lent pointer from the application program, reading out the address corresponding to the lent pointer from the lending pointer table, reading out the data storing the read address in said data field, and giving the read data to the application program.

The data management apparatus of the invention is installed in the switching unit, exchange or transmission apparatus for composing the switching system. Examples of the switching unit, exchange or transmission apparatus include ATM switching unit, frame relay switching unit, packet switching unit, hub, router, and line exchange.

BRIEF DESCRIPTION OF THE DRAWINGS

FIG. 4B is an explanatory diagram showing a data field (MM) in the data management apparatus as shown in FIG. 2.

FIG. 5 is an explanatory diagram showing the data setting area management table in the data management apparatus as shown in FIG. 2.

FIG. 6A is an explanatory diagram showing a usage example of the data setting area management table.

FIG. 6B shows contents of the data field corresponding to a usage state of the data setting area management table as shown in FIG. 6A.

FIG. 13A is an explanatory diagram showing an example of contents of the data field when starting the data allocating process.

FIG. 13B is an explanatory diagram showing contents of the data setting area management table corresponding to the contents of the data field as shown in FIG. 13A.

FIG. 13C is an explanatory diagram showing a table showing contents of the data setting area management table changed from the contents as shown in FIG. 13B through execution of the allocating process about cases 1-4.

DESCRIPTION OF THE PREFERRED EMBODIMENT

Figure 1:
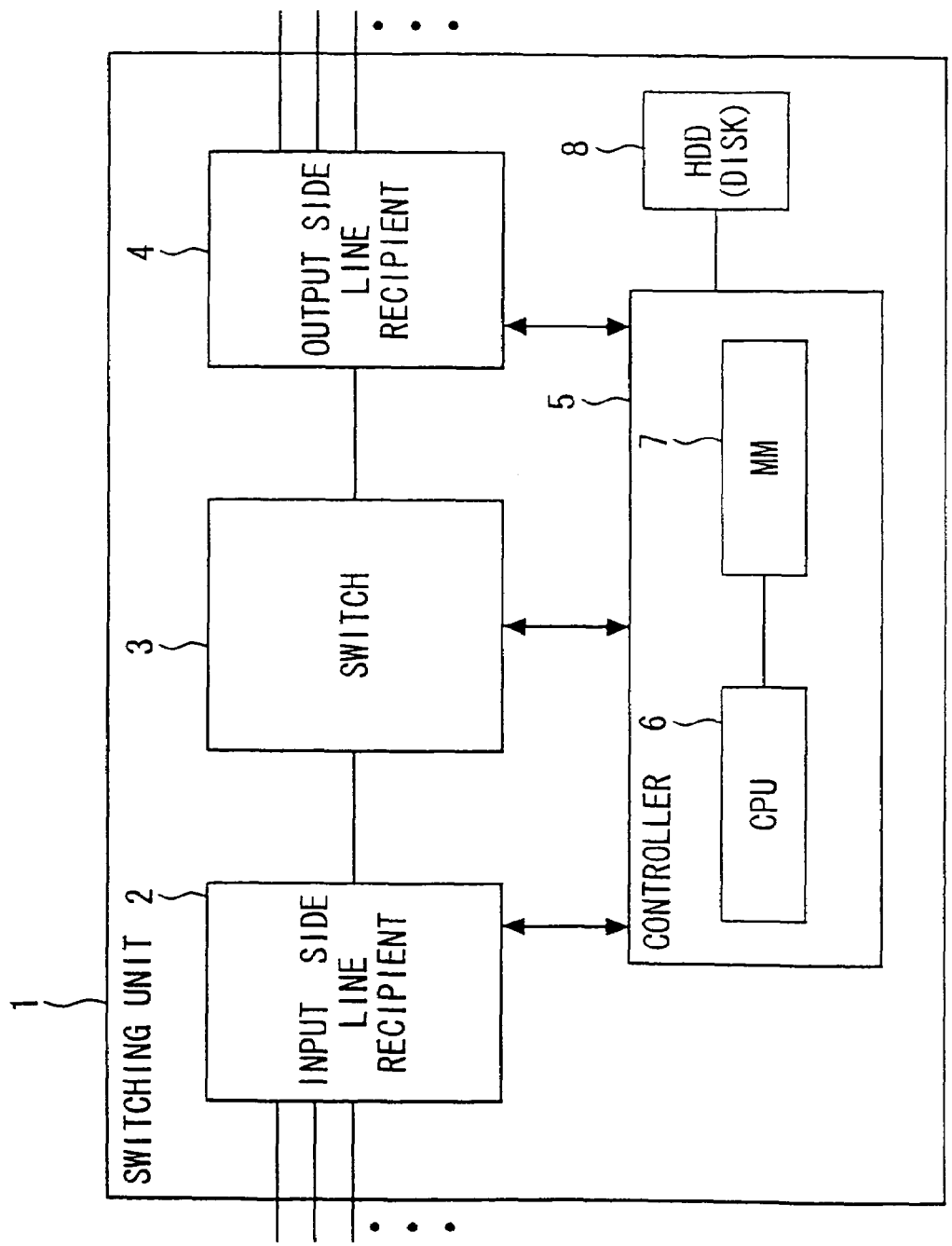
FIG. 1 is a block diagram showing a switching unit to which can be applied a data management apparatus.

Referring now to the drawings, an embodiment of the invention is described in detail below.

[Composition of Switching Unit]

FIG. 1 is a block diagram showing an example of a switching unit 1 included in a switching system according to the invention. In FIG. 1, the switching unit 1 comprises an input side line handler 2, a switch 3, an output side line handler 4, a controller 5, and a hard disk (DISK) 8.

The input side line handler 2 accommodates a plurality of communication lines, and executes data reception process, data format conversion process, and others. The switch 3 sends out the data entered from the input side line handler 2, toward an output port corresponding to the data. The output side line handler 4 converts the data format, and sends out the data converted in format from a corresponding output port.

The controller 5 comprises a CPU 6, a main memory (MM) 7, a ROM (not shown) storing various programs, and others. The CPU 6 controls the input side line handler 2, switch 3, and output side line handler 4 by executing at least one of program.

That is, the controller 5 executes setting of connection through the switching unit 1, management of resource relating to the connection, switching process of the switch 3, congestion control, and other exchange service presentation process. The controller 5 also manages the data relating to exchange service presentation process.

[Composition of Data Management Apparatus]

Figure 2:
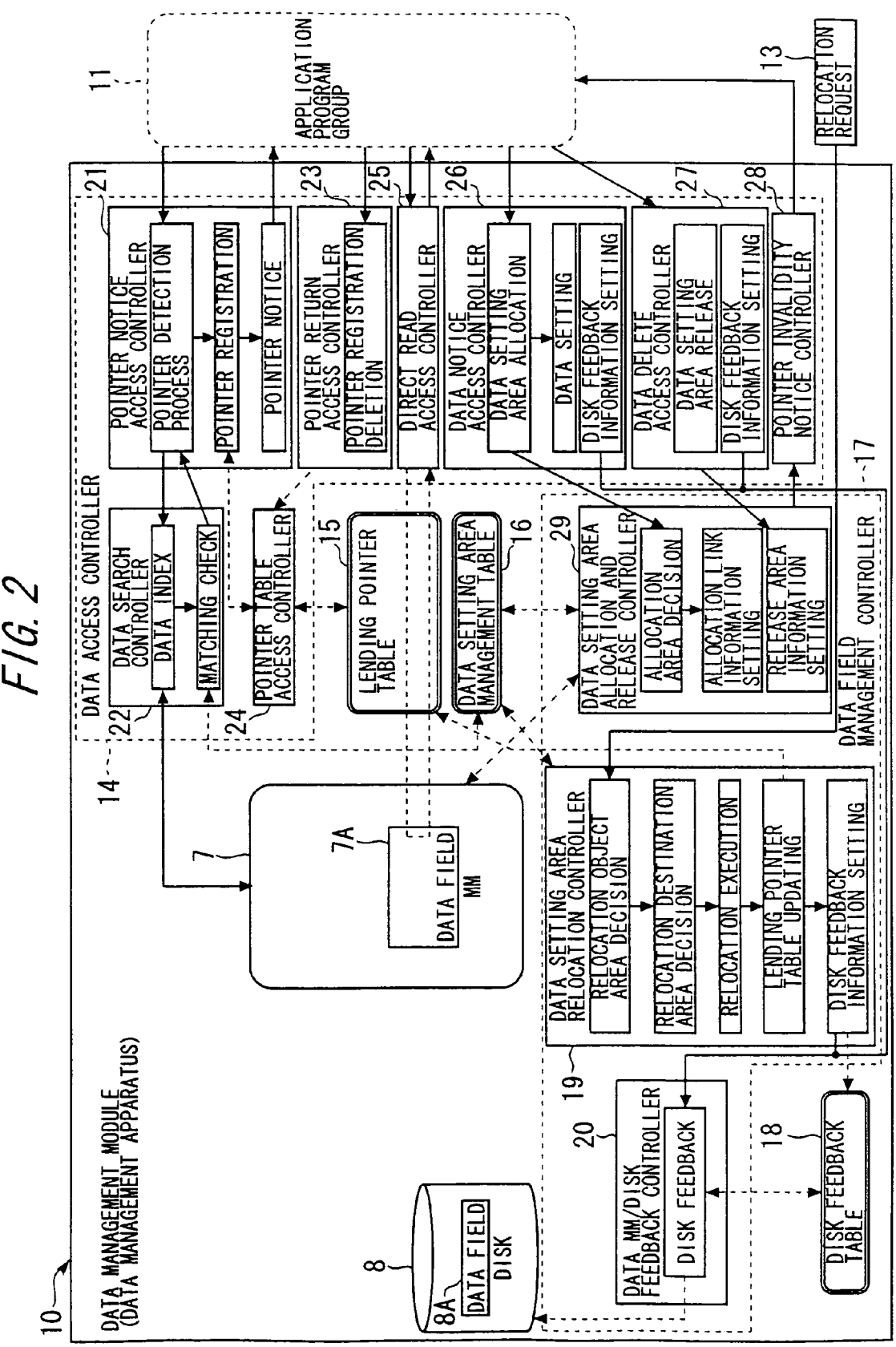
FIG. 2 is a block diagram showing an embodiment of a data management apparatus (data management module) included in the switching unit as shown in FIG. 1.

FIG. 2 is a functional block diagram of the controller 5. The controller 5 functions, when the program is executed, as an apparatus composed of a data management module 10 corresponding to the data management apparatus of the invention, an application program group 11, and a relocation requester 13 as shown in FIG. 2.

The application program group 11 is composed of plural application programs for executing the exchange service presentation process. The data management module 10 manages the data in which is used by the application program group 11 when the exchange service presentation process is executed. The relocation requester 13 requests relocation of data to the data management module 10.

The data management module 10 comprises the MM 7, the DISK 8, a data access controller 14, a lending pointer table 15, a data setting area management table 16, a data field management controller 17, and a DISK feedback data table 18.

The data field 7A is provided in the MM 7. The data field 8A is provided in the DISK 8. A structure of the data field 8A is the same as the data field 7A. Each of the data fields 7A and 8A hold at least one of data for using in exchange service presentation process. Each of the data fields 7A and 8A is composed of plural data setting areas having a predetermined size respectively. The data setting area is the minimum unit of the data allocation process and the data releasing process in the data field 7A. Each of the data fields 7A and 8A has an allocation and release field and a fixed field. The allocation and release field is a storage field for storing at least one of non-fixed data in which can be added, changed and deleted corresponding to the request of each of the application programs. The fixed field is a storage field for storing at least one of fixed data in which not released after once stored. The allocation and release field is provided sequentially from the head of each of the data fields 7A and 8A. The fixed field is provided sequentially from the end of each of the data fields 7A and 8A. The non-fixed data is stored sequentially from the head of the allocation and release field (the head of the data field). The fixed data is stored sequentially from the end of the fixed field (the end of the data field).

The DISK 8 holds the backup data of the MM 7. Accordingly, the content of the data field 7A of the MM 7 is feedback to the data field 8A of the DISK 8.

The data access controller 14 has a pointer notice access controller 21, a data search controller 22 and a pointer table access controller 24 as a lender of the invention. The data access controller 14 has a pointer return access controller 23, a direct read access controller 24 as a reader of the invention, a data add access controller 26 as an adder of the invention, a data delete access controller 27 as a deleter of the invention, and a pointer invalidity notice controller 28 as an invalidity informer of the invention.

The pointer notice access controller 21 includes a "pointer detection" program, a "pointer registration" program, and a "pointer notice" program. The pointer notice access controller 21 acquires a record address, as a pointer of the invention, corresponding to the request of the application program from the lending pointer table 15, and gives the record address to the application program by the execution of at least one of these programs.

The data search controller 22 includes a "data index" program and a "matching check" program. The data search controller 22 acquires a data field pointer, as an address of the data setting area, in the data field 7A requested from each of the application programs by the execution of at least one of these programs.

The pointer return access controller 23 includes a "pointer registration delete" program. The pointer return access controller 23 receives a pointer return notification of the record address from each of the application programs. The pointer return notification indicates end of use of the record address.

The pointer table access controller 24 refers and/or updates to the content of the lending pointer table 15. By the controllers 21, 22, 23 and 24, at least one of data field pointer lend the application program and information indicating status of use of a data setting area corresponding to this data field pointer is managed in the lending pointer table 15.

The direct read access controller 25 receives the record address from the application program. The direct read access controller 25 reads out the received record address corresponding to the data field pointer from the lending pointer table. The direct read access controller 25 directly reads out the requested data from the data field 7A, without data index, by using the data field pointer.

The data add access controller 26 includes a "data setting area allocation" program, a "data setting" program and a "DISK feedback information setting" program. The data add access controller 26 executes the data add process of the data when addition of data is requested from one of the application programs by the execution of at least one of these programs.

The data delete access controller 27 includes a "data setting area release" program and a "DISK feedback information setting" program. The data delete access controller 27 executes the data delete process of the data when deletion of the data is requested from one of the application programs by the execution of at least one of these programs.

By the data add access controller 26 and data delete access controller 27, the disk feedback quantity of the relocated data when relocating the data can be curtailed, and the system unstable time can be shortened.

Figure 4A:
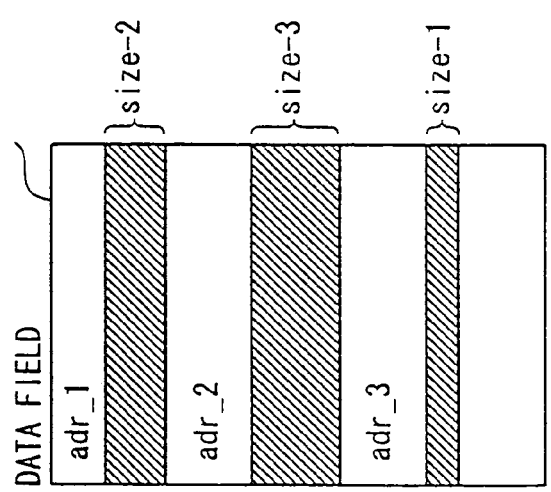
FIG. 4A is an explanatory diagram showing a lending pointer table in the data management apparatus as shown in FIG. 2.

FIG. 4 (A) is an explanatory diagram of the lending pointer table 15 shown in FIG. 2. FIG. 4 (B) is an explanatory diagram of the data field 7A. In FIG. 4 (A), the lending pointer table 15 is composed of m pieces of record areas individually assigned with the record address ("tbl-1", etc.). Each record area holds one record as "pointer record" of the invention. Each record has "data field pointer ("adr-1", etc.)", "data storage area size ("size-1", etc.)", "application entry address", and "status of use" as a plurality of elements corresponding to the record address.

Herein, the "record address" is the address value of each record of the lending pointer table 15, and it is used as the pointer of the invention. The data field pointer is the beginning address value of the data storage area of the target of pointer lending (the target of direct reading by application program). The data storage area is composed of single or plural data setting areas necessary for storing data, and the size of the data storage area is defined (for example, "size-1", "size-2", etc.) depending on the number of data setting areas for composing the data storage area.

The "data storage area size" is the data showing the size of the data storage area. The "application entry address" is the data showing the name of the application program acquiring the record address of the lending pointer table 15 (corresponding to the specific information of the application program). The "status of use" is the data showing whether the direct reading using the record is executed or not. FIG. 4 (A) shows the content held in the lending pointer table 15 in the case that the data field of the MM 7 is the content in FIG. 4 (B).

FIG. 5 is an explanatory diagram of the data setting area management table 16 shown in FIG. 2. FIG. 6 shows an example of use of the data setting area management table 16. In FIG. 5, the data setting area management table 16 stores "data of status of use of entire data field", "beginning address of allocation and release field", "ending address of fixed field", "minimum address of each size of continuous empty areas", "allocation and release occurrence frequency statistic data", "status of use of each data setting area", "link information between data setting areas" and "status of relocation".

The "status of use of entire data field" stores the total size of the data setting area used in holding of data and the total size of the unused area (empty area) of the data fields 7A of the MM 7. The "beginning address of allocation and release field" and the "ending address of fixed field" store the search starting address of the empty area when allocating the data in the data setting area (corresponding to the address of the data setting area of empty state).

The "minimum address of each size of continuous empty areas" stores the minimum address of each size of the continuous empty areas (corresponding to the specific information in the empty area). The "continuous empty area" is a single or plural data setting areas of a continuous and empty state, and has a size corresponding to the number of the data setting area composing of the continuous empty area (size-1, size-2, etc.). Along with operating of the switching unit, when deletion or relocation of the data in the data field 7A is executed, the empty areas scatter about in the data field 7A. Each of the empty areas is composed of a single data setting area or continuous plural data setting areas. That is, each of the empty areas composes of the continuous empty area respectively. The beginning address of the continuous empty area smallest in the address value is stored as the "minimum address of each size of continuous empty areas" in each size of the continuous empty areas. The "minimum address of each size of continuous empty areas" is referred to when determining the data setting area for newly storing the data at the time of addition of the data or relocation of the data, and is updated in preparation for next data addition or relocation.

The "status of use of each data setting area" stores the address and the status of use in each data setting area. The "link information between data setting areas" stores the address of the data setting area as the link information relating to the link when a link is set between a certain data setting area and other data setting area.

The "allocation and release occurrence frequency statistic data" holds the total number of the data storage areas allocated or deleted the non-fixed data by the allocating process or the releasing process of the data setting area each size of the data storage area. When the allocating process or the releasing process is executed, the total value corresponding to the data storage area allocated or deleted the data is counted up. The "allocation and release occurrence frequency statistic data" is used for determining the size of the data setting area high in frequency of allocation and/or release while the exchange is operating. FIG. 6 (A) shows the held content in the data setting area management table 16 when the data field 7A of the MM 7 is in the state shown in FIG. 6 (B).

Back to FIG. 2, the data field management controller 17 has a data setting area relocation controller 19 as relocator of the invention, a data MM/DISK feedback controller 20 as feedback unit of the invention, and a data setting area allocation and release controller 29 as deleter and adder of the invention.

The data setting area allocation and release controller 29 includes an "allocation decision place" program, an "allocation link information setting" program, and a "released data setting area information setting" program.

The data setting area allocation and release controller 29 determines at least one of the data setting area (the data storage area) that is allocated the data, and updates the data setting area management table 16 by executing the "allocation decision place" program, when the data add access controller 26 add the data to the data field 7A.

The data setting area allocation and release controller 29 sets the link information relating to the allocating of the data to the data setting area management table by executing the "link information setting" program. Further, the data setting area allocation and release controller 29 stores the release area information relating to the data storage area storing the data to be deleted (the data storage area should to be released) by the execution of the "release area information setting" program, when the data delete access controller 27 deletes the data from the data field 7A.

The data setting area relocation controller 19 includes "relocation target area" program, "relocation destination area decision" program, "relocation execution" program, "lending pointer table update" program and "DISK feedback information setting" program. The data setting area relocation controller 19 executes relocation of data by using the held content in the data setting area management table 16 by execution of at least one of these programs.

The data MM/DISK feedback controller 20 includes a "DISK feedback" program. The data MM/DISK feedback controller 20 refers to the held content in the DISK feedback data table 18 and feeds back the result of relocation of the data field 7A on the MM 7 to the data field 8A on the DISK 8 by execution of this program.

By the lending pointer table 15, pointer table access controller 24, data setting area allocation and release controller 29 and pointer invalidity notice controller 28, invalidity of the data setting area corresponding to the record address (pointer) being lent is detected, and the invalidity of the record address is noticed (informed) to the application program at the destination of lending of the record address.

Figure 3:
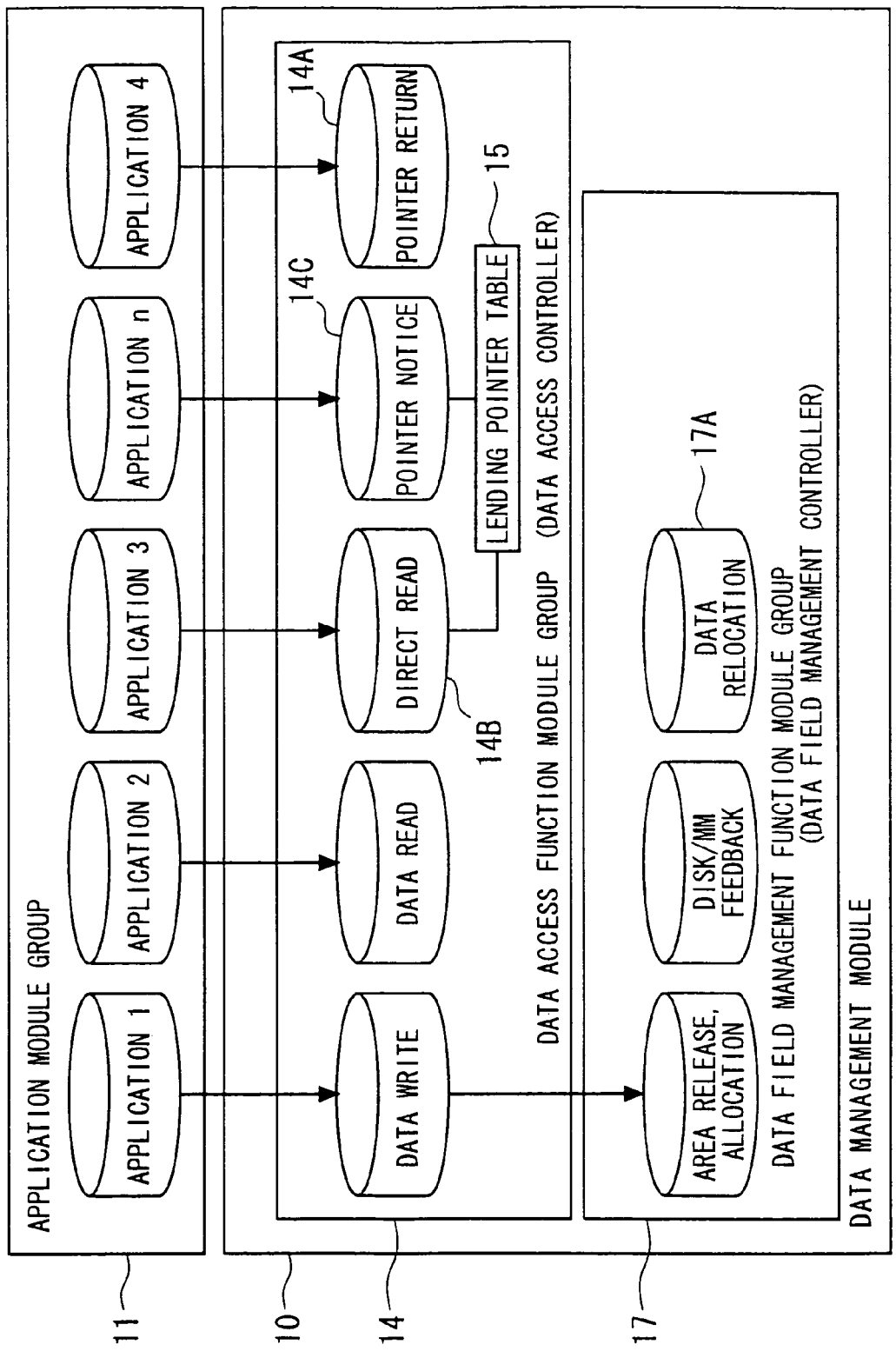
FIG. 3 is a block diagram showing functions of a data management module as shown in FIG. 2.

FIG. 3 is a module block diagram of the function block shown in FIG. 2. As compared with the conventional module structure (see FIG. 22), as modules having application program and interface, a pointer return module 14A (corresponding to the pointer return access controller 23) and a direct read module 14B (corresponding to the direct read access controller 25) are newly provided. As the pointer notice module 14C, further, a pointer notice access controller 21, a data search controller 22, and a pointer table access controller 24 are newly provided. Further, the data relocation module 17A corresponding to the data setting area controller 19 is provided.

Figure 22:
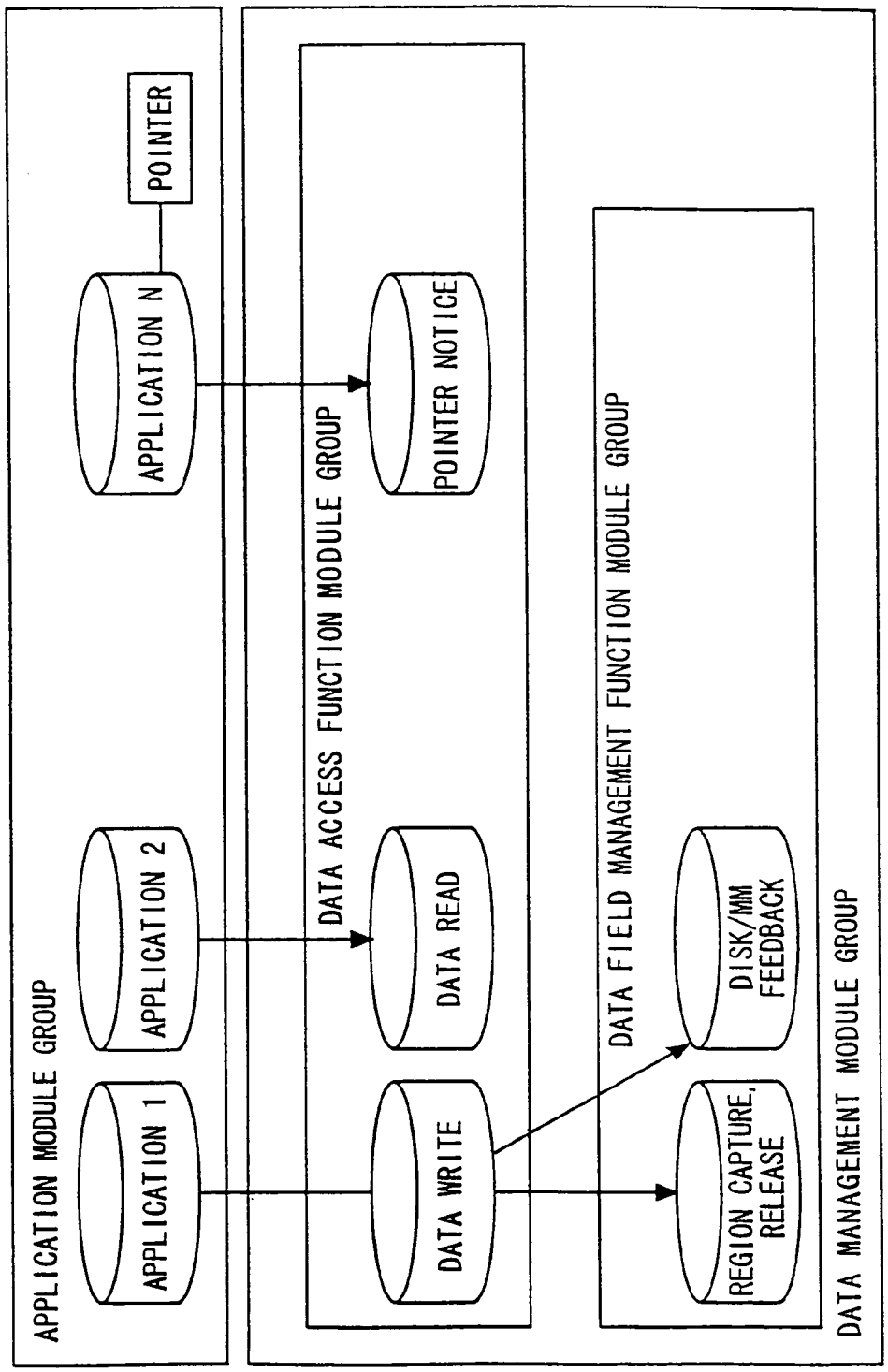
FIG. 22 is an explanatory diagram of a prior art showing functions of a data management module.

Hitherto, as shown in FIG. 22, each of the application programs has held the pointer information for direct data read access, but in this embodiment, the data management module 10 holds the lending pointer table 15. Therefore, in the maintenance and operating service of data executed by the data management module 10, if the data is relocated or deleted, it is possible to check if the pointer of the corresponding data setting area is being used by each of the application programs or not.

[Examples of Operation]

Examples of operation (processing of data management module 10) of the data management module 10 are explained below by referring to FIG. 2 and FIG. 7 to FIG. 17.

(Lending of Pointer)

Figure 7:
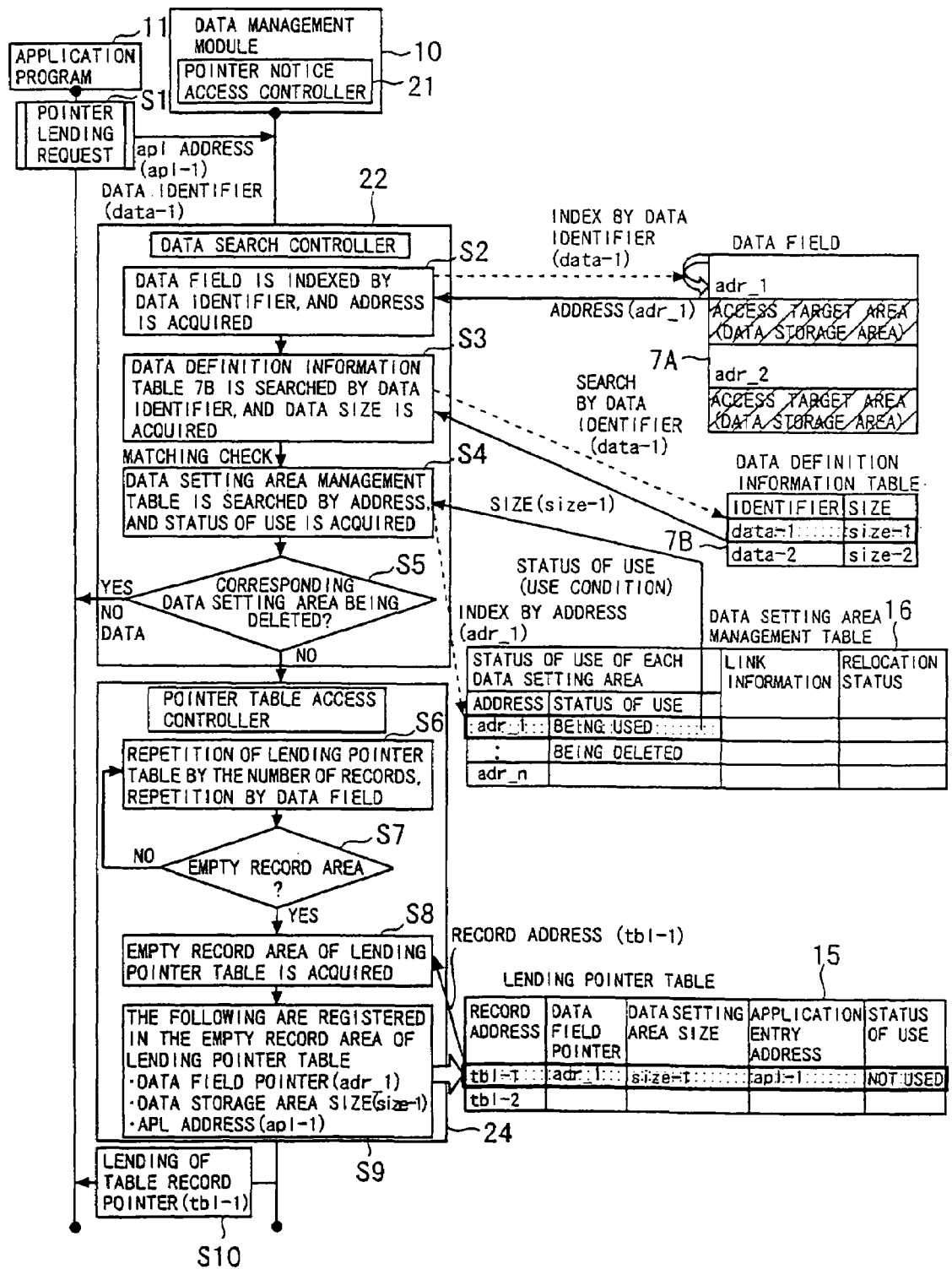
FIG. 7 is an explanatory diagram showing a pointer lending process executed by the data access controller as shown in FIG. 2.

First is explained an example of operation of pointer lending to each of the application programs by using the lending pointer table 15. FIG. 7 is an explanatory diagram of pointer lending operation by the data management module 10.

Each application program in the application program group 11 requests, when accessing the data field 7A of the MM 7, the lending of a pointer to the data storage area as an access target area stored the desired data, to the pointer notice access controller 21 of the data management module 10 (S1). That is, the application program gives, as the pointer lending request, the application entry address (for example, "apl-1") of application program, and data identifier of desired data (for example, "data-1"), to the pointer notice access controller 21.

The pointer notice access controller 21 requests the detection of an address of the data storage area to the data search controller 22 by the execution of the "pointer detection processing" program. The data search controller 22, by executing the "data index" program, searches the MM 7 by using the noticed data identifier "data-1" as the key, and detects the address in the data storage area corresponding to the data identifier (for example, "adr_1") (S2).

Next, the data search controller 22 acquires the data size corresponding to the data identifier (size of the data storage area stored the desired data: for example, "size-1") from the definition information table 7B in the MM 7 (S3).

The data search controller 22, further, by executing the "matching check" program, searches the data setting area management table 16 by using the address "adr_1" as the key, and acquires the status of use (for example, "being used") of the data setting area corresponding to the address "adr_1" (S4).

Consequently, on the basis of the status of use acquired at S4, the data search controller 22 judges if the corresponding data setting area is "being deleted" or not (S5). If the status of use is "being deleted", the message of "no data" is noticed to the corresponding application program through the pointer notice access controller 21. As a result, reading of data in unstable state in the midst of deletion is prevented. By contrast, when the status of use is not "being deleted", the data search controller 22 transfers the acquired address "adr_1" and the acquired data size "size-1" to the pointer notice access controller 24.

The pointer notice access controller 21, when receiving the acquired address and the acquired data size, requests registration of the acquired address, the acquired data size and the received application entry address to the pointer table access controller 24 by the execution of the "pointer registration" program.

The pointer table access controller 24 refers to the lending pointer table 15, detects an empty record area (S6, S7), and acquires the record address (for example, "tbl-1") of the detected empty record area (S8) The record address is the "pointer" requested from the application program. The record address corresponds to the "pointer" of the invention.

Next, the pointer table access controller 24 registers the acquired address "adr_1" as the "data field pointer", the acquired data size "size-1" as the "data storage area size", and the application entry address "apl-1" in this empty record area. Then, the pointer table access controller 24 sets the "status of use" of this record area to the "not used". Further, the pointer table access controller 24 notices the record address "tbl-1" of the record area in which the record is registered, to the pointer notice access controller 21.

As a result, the pointer access controller 21, by the execution of the "pointer notice" program, notices the record address "tbl-1" as the pointer to the application program requesting lending of the pointer (S10).

Thus, the data management module 10 lends the pointer (record address) for directly accessing the data field 7A in the MM 7 to each application program in which requests lending of the pointer.

(Direct Reading)

The operation of reading desired data from the data field 7A by the application program receiving the pointer (record address) from the data management module 10 is explained below (direct reading operation).

Figure 8:
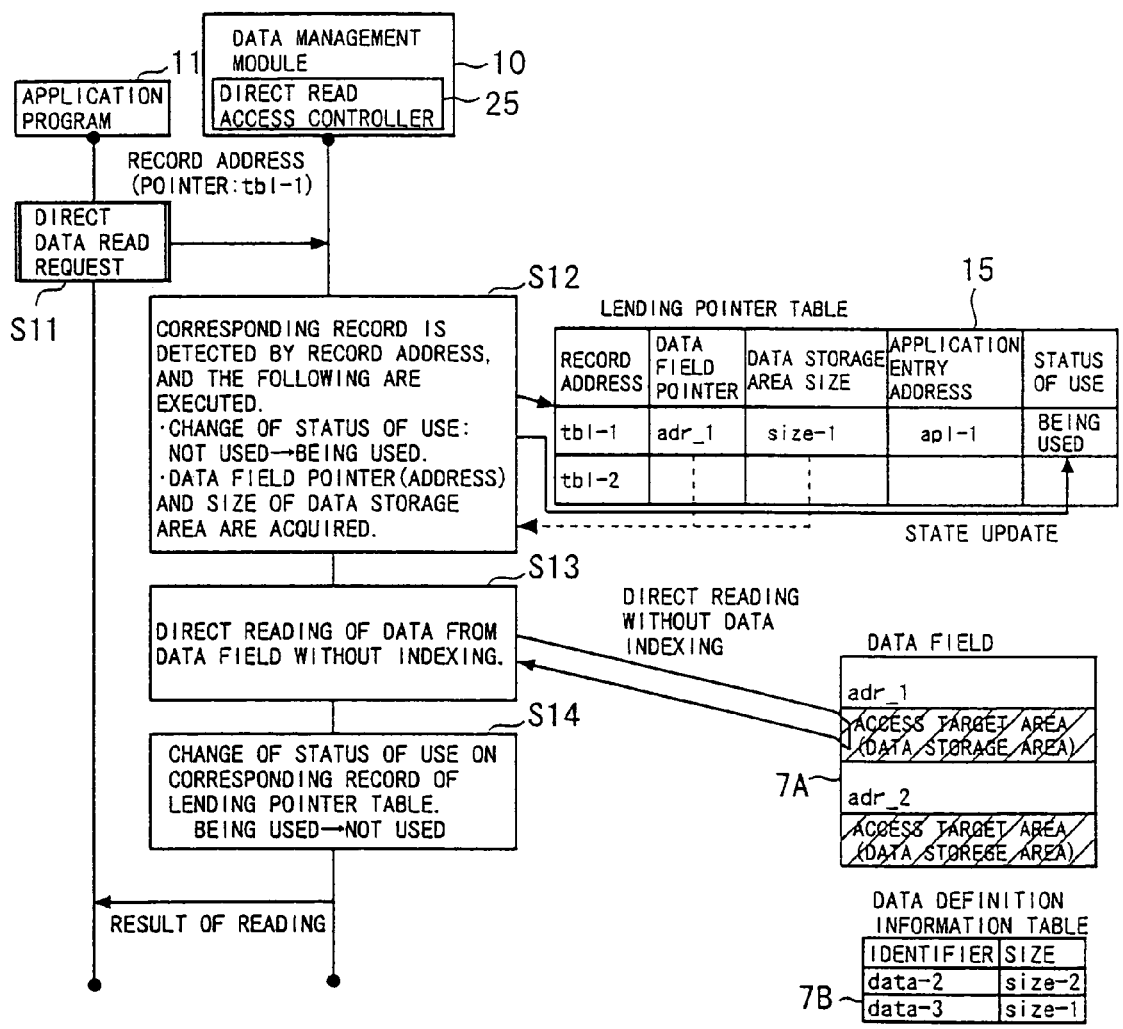
FIG. 8 is an explanatory diagram showing a data direct rending process through a usage of a pointer executed by the direct read access controller as shown in FIG. 2.

FIG. 8 is an explanatory diagram of the direct reading process by the data management module 10. As shown in FIG. 8, each application program in the application program group 11 requests, when reading out data from the data field, direct reading of data to the direct read access controller 25 of the data management module 10 (S11). That is, each application program notices the preliminarily acquired pointer (record address: for example, "tbl-1") to the direct read access controller 25 of the data management module 10.

The direct read access controller 25, when receiving the pointer "tb1-1", detects the record corresponding to this pointer from the lending pointer table 15, and changes the status of use in this record from "not used" to "being used". It hence prevents changing of the value of the data field pointer in the record by the relocation process. In succession, the direct read access controller 25 acquires the data field pointer "adr_1" and the data storage area size "size-1" in the record (S12).

Further, the direct read access controller 25 directly accesses the address "adr_1" of the data field 7A without indexing, by using the acquired data field pointer "adr_1", and reads out the data corresponding to this address "adr_1" (S13).

The direct read access controller 25 refers to the lending pointer table 15, and changes the "status of use" in the record corresponding to the record address "tbl-1" from the "being used" to the "not used" (S14)

Afterwards, the data being read is given from the direct read access controller 25 to the application program requesting to read out. The application program receiving the data executes the exchange service presentation process by using the data.

On the other hand, when it is not necessary to access the data corresponding to the noticed pointer (the record address) each application program informs the pointer return access controller 23 that this pointer is not used. As a result, the pointer return access controller 23 informs the pointer table access controller 24 of this fact. Then the pointer table access controller 24 deletes the record corresponding to this pointer. That is, each application program gives the record address to the pointer return access controller 23. The pointer return access controller 23 gives the received record address to the pointer table access controller 24 by the execution of the "pointer registration delete" program. The pointer table access controller 24 deletes the record corresponding to the received record address from the lending pointer table 15.

(Release of Data Setting Area)

Figure 9:
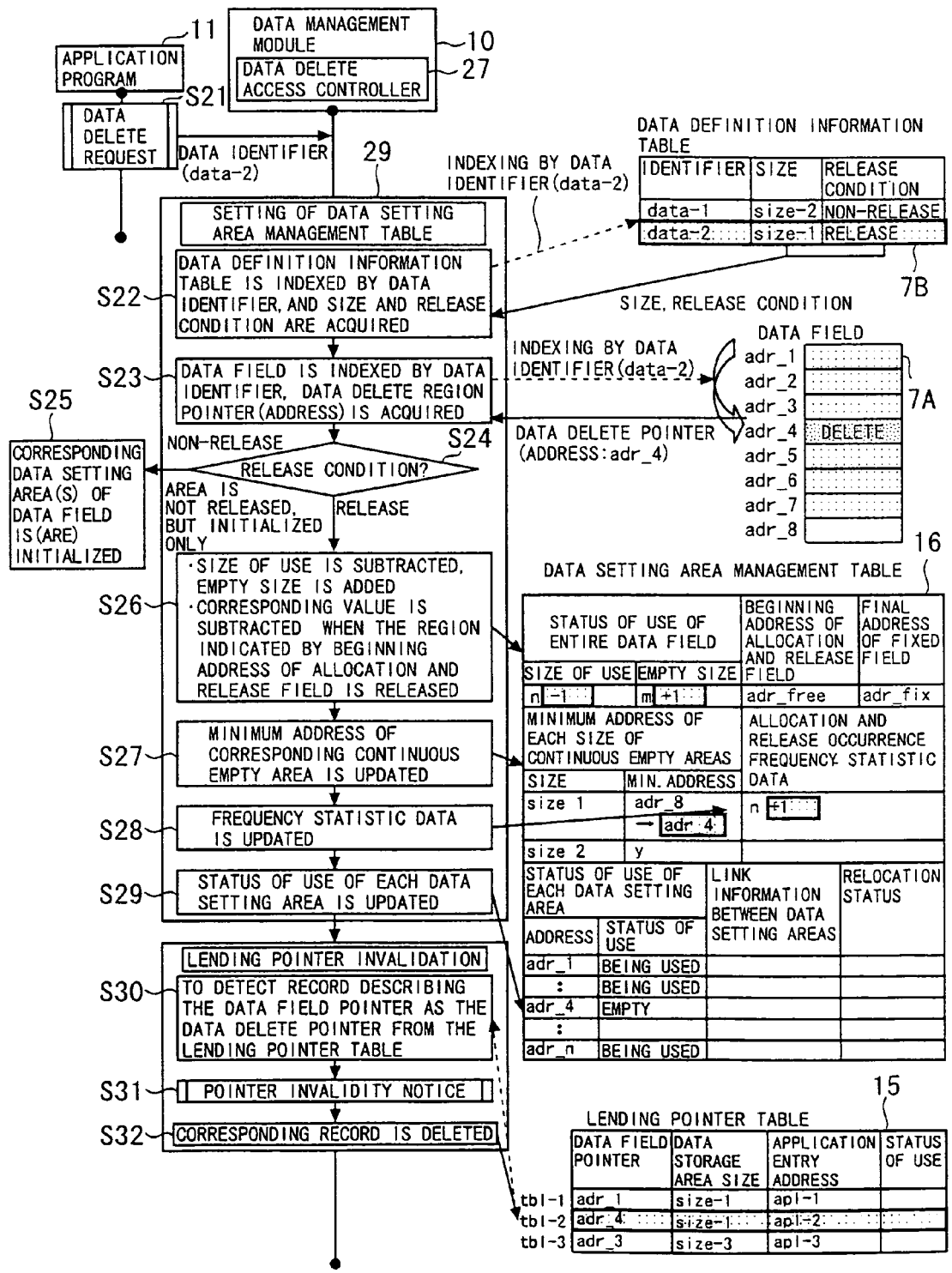
FIG. 9 is an explanatory diagram showing an example of a releasing process executed by the data delete access controller as shown in FIG. 2 when deleting data from the data field.

The releasing operation of data setting area by using the data setting area management table 16 is explained. FIG. 9 is an explanatory diagram of the release process by the data management module 10.

As shown in FIG. 9, when deleting the data from the data field, each application program in the application program group 11 requests deletion of data to the data management module 10. That is, each application program notices the identifier (for example, "data-2") of the data to be deleted to the data delete access controller 27 of the data management program 10.

The data delete access controller 27, by the execution of the "data setting release" program, and requests setting of released area information to the data setting area allocation and release controller 29.

Then the data setting area allocation and release controller 29, by the execution of the "released data setting area information setting" program, updates the data setting area management table 16. The data setting area allocation and release controller 29, specifically, searches the data definition information table 7B in the MM 7 by using the data identifier "data-2" as the key, and acquires the data storage area size "size-1" corresponding to the data identifier "data-2" and the release condition "release" (S22).

Consequently, the data setting area allocation and release controller 29 searches the data field 7A in the MM 7 by using the data identifier "data-2" as the key, and acquires the address as the data deletion pointer (for example, "adr_4") corresponding to the data identifier "data-2" (S23).

The data setting area allocation and release controller 29 then judges if the release condition acquired at S22 is "non-release" or "release" (S24). At this time, when the release condition is "non-release", the data storage area in the data field 7A corresponding to the data deletion pointer is initialized (S25).

By contrast, when the release condition is "release", the data setting area allocation and release controller 29 refers to the data setting area management table 16, and subtracts the size of the data storage area to be released as a result of deletion of data, from the value of the "size of use" in the table 16 (n−1) and adds the size of the data setting area to be released from the value of the "empty size" in the table 16 (m+1). At this time, when the data setting area indicated by the "beginning address of the allocation and release field" in the table 16 is released, the "beginning address of the allocation and release field" is subtracted by the value of "size of use" (S26).

Figure 10:
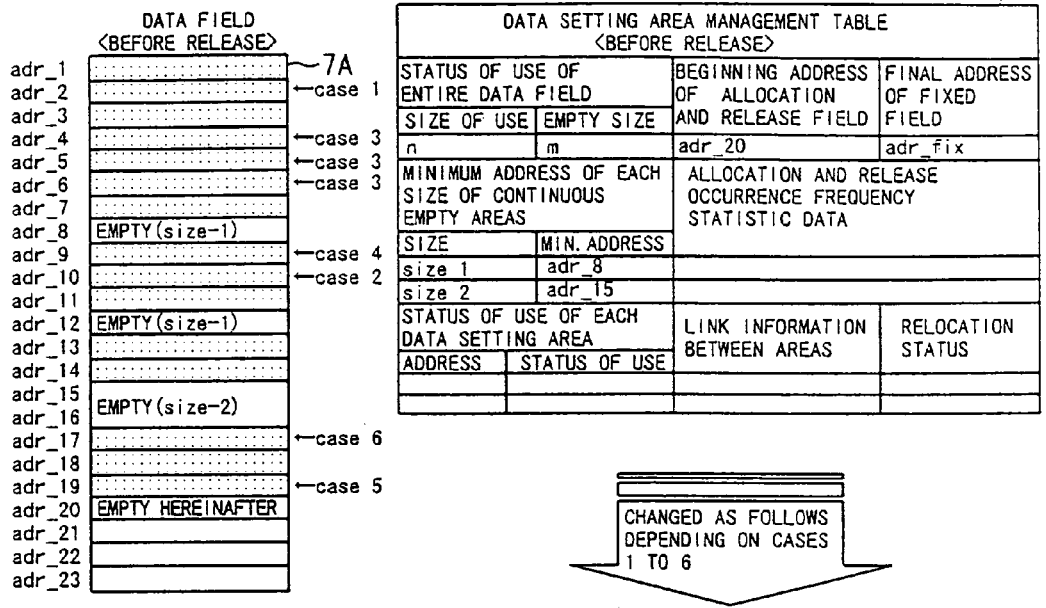
FIG. 10A is an explanatory diagram showing an example of contents of the data field when starting the release process.
FIG. 10B is an explanatory diagram showing contents of the data setting area management table corresponding to the contents of the data field as shown in FIG. 10A.
FIG. 10C is an explanatory diagram showing a table showing contents of the data setting area management table changed from the contents as shown in FIG. 10B through execution of the releasing process about cases 1-6.

Further, the data setting area allocation and release controller 29 updates the "minimum address of each size of empty continuous areas" in the data setting area management table 16 (S27). FIG. 10 is an explanatory diagram of the release process. FIG. 10(A) shows a statement of the data field 7A before the release process. In FIG. 10 (A), each case 1 to 6 shows an example of the address that is released by the release process (example of the data delete pointer). FIG. 10(B) shows a statement of the data setting area management table 16 before executing of the release process. FIG. 10(C) shows a statement of the data setting area management table 16 after the release process about the corresponding address of each of the cases 1 to 6.

The data setting area allocation and release controller 29 then updates (adds) the "allocation and release occurrence frequency statistic data" in the data setting area management table 16 (S28) Also the data setting area allocation and release controller 29 sets the "status of use of the data setting area" of the corresponding address in the data setting area management table 16 to "empty state (not used)" (S29).

On the other hand, the data setting area allocation and release controller 29 notices the data deletion pointer "adr_4" to the pointer invalidity notice controller 28. As a result, the pointer invalidity notice controller 28 detects the record having the data deletion pointer "adr_4" as the data field pointer, from the lending pointer table 15 (S30).

The pointer invalidity notice controller 28 notices the invalidity of the pointer (the record address) to the application program (in this case, "apl-2") corresponding to the application entry address in the record (S31).

In succession, the pointer invalidity notice controller 28 deletes the record corresponding to the data deletion area pointer from the lending pointer table 15 (S32). As a result, the pointer being lent to the application program is invalid.

By this process, the application program cannot access the data storage area of which deletion has been requested, and substantially the data is deleted from the data field 7A.

The data setting area allocation and release controller 29, when processing at S32 is completed, notices the end of process about data deletion to the data delete access controller 27. Then the data delete access controller 27 notices this fact to the application program that has requested data deletion.

The data delete access controller 27, by the execution of the "DISK information feedback setting" program, registers the change content in the data field 7A relating to deletion of data in the DISK feedback table 18 as DISK feedback information, and notices the change of the held content in the data field 7A to the data MM/DISK feedback controller 20.

Consequently, the data MM/DISK feedback controller 20, by executing of the "DISK feedback" program, and changes the held content in the data field 8A of the DISK 8 on the basis of the DISK feedback information held in the DISK feedback data table 18. As a result, the held content of the data in the data field 7A of the MM 7 and the held content of the data in the data field 8A of the DISK 8 are matched.

Thus, by the release process, in the initial state when the switching unit is ready to operate, the data is set in the data field 7A tightly from the beginning. When the switching unit is put in operation, the release process occurs, and the empty areas scatter about in the data field 7A once used without empty space.

By the release process, when the data setting area (the data storage area) is released, as the information of the released data storage area, the "status of use" in the data setting area management table 16 is set in "empty", the "minimum address of each size of continuous empty areas" is updated, and the "allocation and release occurrence frequency statistic data" in the table 16 is updated.

If the data setting area (the data storage area) to be released is continues to an already empty area, concerning the coupled size, the "beginning address of allocation and release area" and the "minimum address of each size of the continuous empty areas" in the data setting area management table 16 are updated (see FIG. 10). As a result, at the time of next allocation of the data, the data can be allocated efficiently without allowing empty space in the data field 7A.

(Allocation of Data Setting Area)

Figure 11:
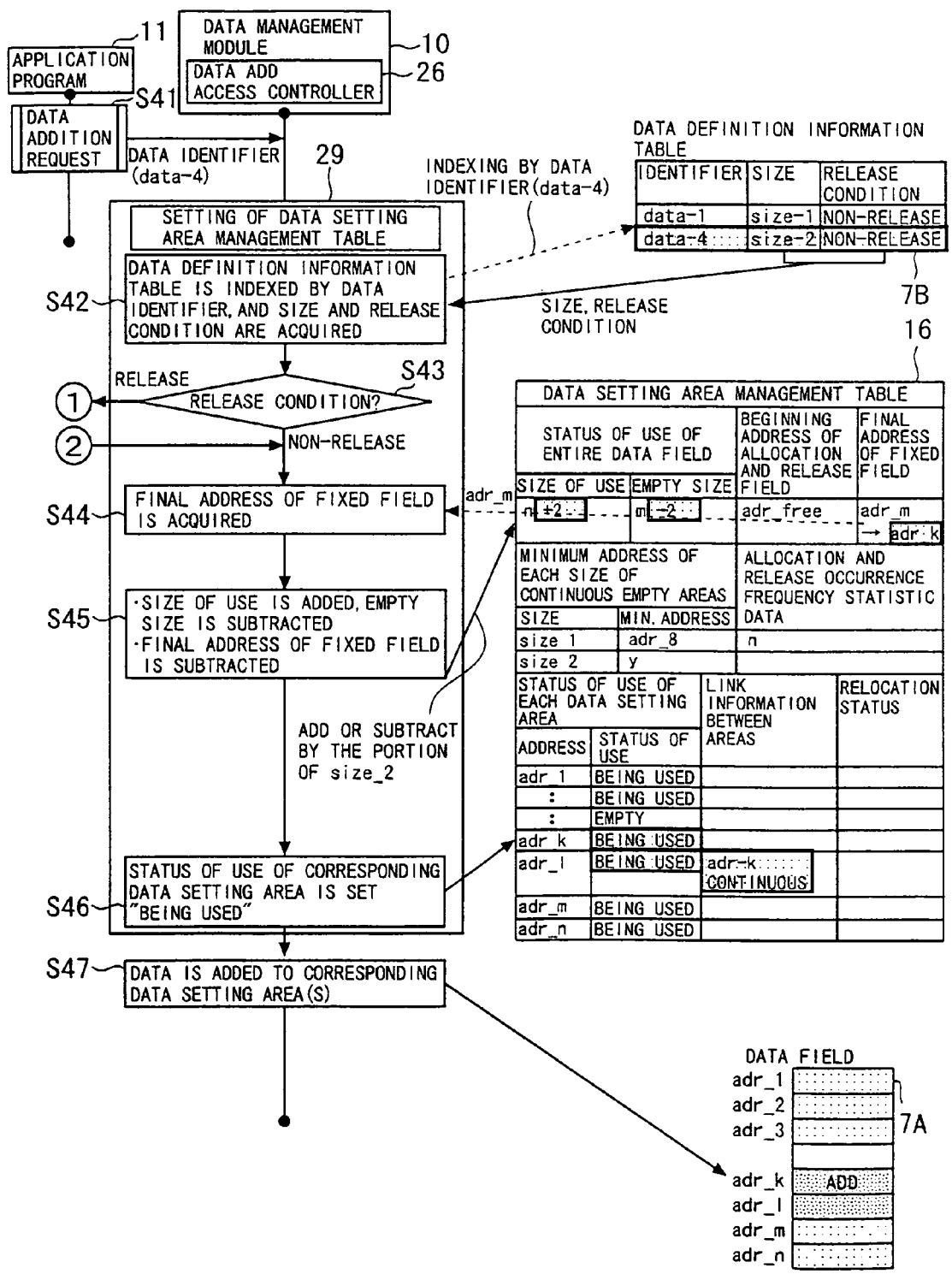
FIG. 11 is an explanatory diagram showing an example of a data allocating process executed by the data add access controller as shown in FIG. 2 when adding data to the data field.

This is an explanation of an example of operation of the data allocation of the data setting area using the table 16. FIG. 11 is an explanatory diagram showing an example of the data allocation process by the data management module 10. FIG. 11 shows an operation of the data allocation process of the data field 7A relating to the fixed data.

Each application program, when requesting addition of data, gives the data identifier (for example, "data-4") of the data to be added to the data add access controller 26 in the data management module 10 (S41).

The data add access controller 26, by the execution of the "data setting area allocation" program, gives the data identifier "data-4" to the data setting area allocation and release controller 29. The data setting area allocation and release controller 29 accesses the data definition information table 7B in the MM 7, and acquires the size corresponding to the data identifier "data-4" ("size-2": two data setting areas) and release condition "non-release" from the table 7B (S42).

Next, the data setting area allocation and release controller 29 judges if the acquired release condition is "release" or "non-release" (S43). At this time, if the release condition is "non-release", the operation advances to S44, and if "release", the operation advances to S54 in FIG. 12. Herein, supposing the data is "non-release" data, the operation goes to S44.

At S44, the data setting area allocation and release controller 29, by executing the "allocation place setting" program, accesses the data setting area management table 16, and acquires the address value (for example, "adr_m") of the "ending address of the fixed field" in the table 16.

Next, the data setting area allocation and release controller 29 executes the "allocation link information setting" program. Thereby, the area allocation and release controller 29 adds the size of data to be added ("size-2") to the value of the "size of use" in the table 16, and subtracts the size of the data to be added from the value of the "empty size" in the table 16. Further, the controller 29 subtracts the value of the "ending address of the fixed field". As a result, the address value of the "ending address of the fixed field" is updated from "adr_m" to "adr_k" (S45).

Consequently, the controller 29 sets the corresponding addresses "adr_k" and "adr_l" of the status of use of the data setting area in the table 16 in "being used" (S46).

Later, the fixed data requested to be added is stored in the addresses "adr_k" and "adr_l" of the fixed data field of the data field 7A in the MM 7 (S47). Thus, the fixed data is added to the fixed field of the data field 7A.

Figure 12:
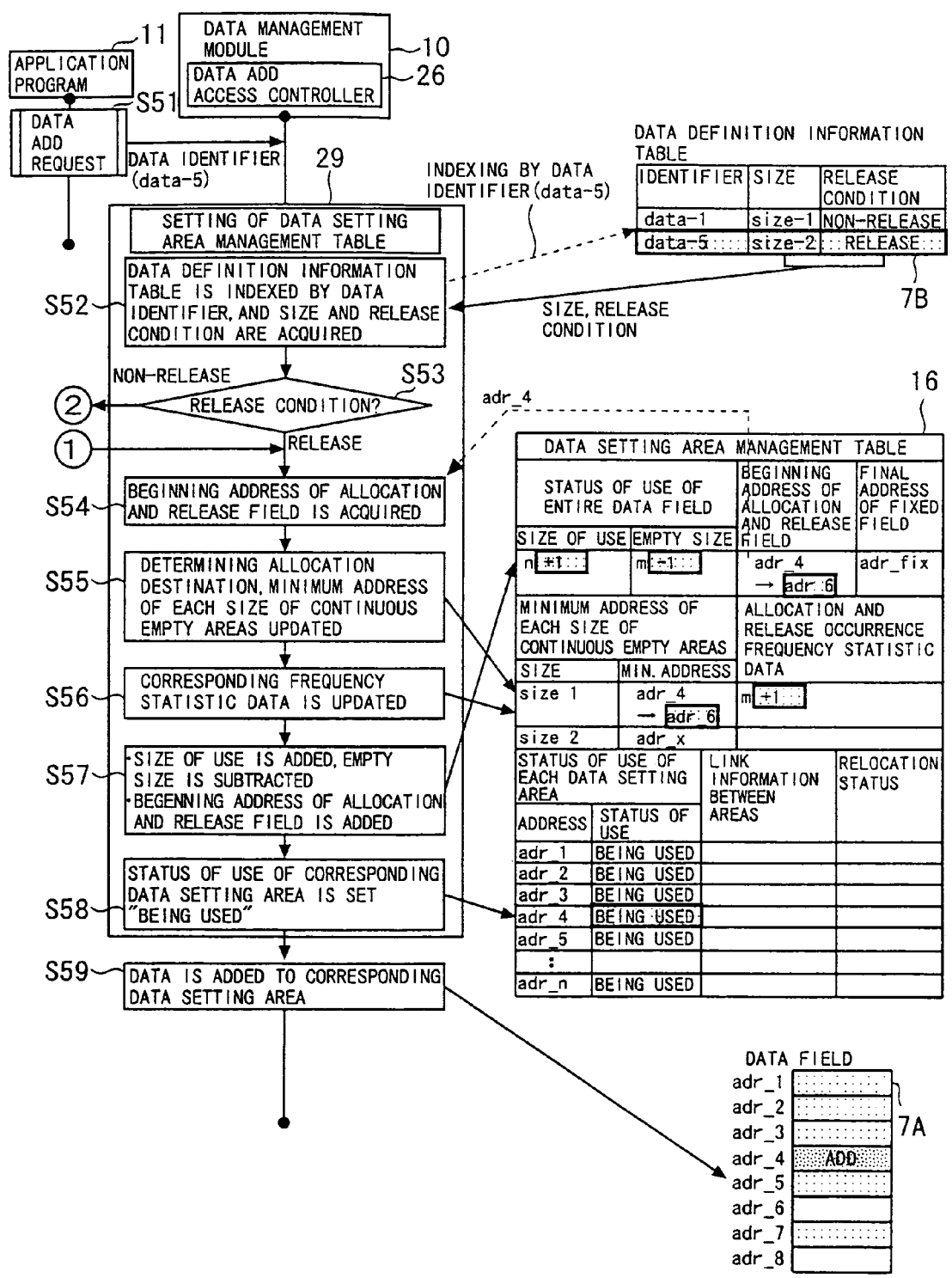
FIG. 12 is an explanatory diagram showing another example of the data allocating process.

FIG. 12 is an explanatory diagram showing an allocation operation of the data (non-fixed data) to be released (deleted) as required into the data field. In FIG. 12, the operation at S51 to S53 is same as the operation at S41 to S43 in FIG. 11. That is, when the data identifier (for example, data-5) of the non-fixed data which is requested to be added is given from the application program to the data management module 10 (S51), the data setting area allocation and release controller 29 acquires the size "size-1" corresponding to the data identifier "data-5" and the release condition "release" from the data definition information (S52).

In succession, the data setting area allocation and release controller 29 judges that the release condition is "release" (S53) and the operation goes to S54. However, at S53, when the release condition is judged to be "non-release", the operation goes to S44 in FIG. 11, and the same operation as mentioned above is executed.

At S54, the data setting area allocation and release controller 29 executes an allocation place setting program, accesses the data setting area management table 16, and acquires the address value (for example, adr_4) of the beginning address of allocation and release field in the table 16.

Further, the data setting area allocation and release controller 29 executes an allocation link information setting program, determines the allocation destination of non-fixed data, and updates the beginning address of allocation and release field and minimum address of each size of continuous empty areas of the table 16 (S55).

That is, the data setting area allocation and release controller 29 updates the data setting area management table 16 as shown in FIG. 13 (C), corresponding to the state of cases 1 to 4 shown in FIG. 13 (C), for example, when the data field before release is in the state shown in FIG. 13 (A), and the content of the table 16 before release is in the initial state (case 0) in FIG. 13 (B).

Next, the data setting area allocation and release controller 29 adds "1" to the value corresponding to "size-1" of the allocation release onset frequency statistic data in the table 16 (S56).

Still more, the data setting area allocation and release controller 29 adds the size (portion of "size-1") of the data to be added to the value of the size of use in the data setting area management table 16, and subtracts the size of the data to be added from the value of the empty size. Moreover, the data setting area allocation and release controller 29 adds the value of the beginning address of allocation and release field. As a result, the address value of the beginning address of the allocation and release field is updated from "adr_4" to, for example, "adr_6" (S57).

The data setting area allocation and release controller 29 then sets the corresponding address "adr_4" of the status of use of the data setting area in the table 16 in "being used" (S58).

Later, the non-fixed data requested to be added is stored in the address "adr_4" in the data field (S59). Thus, the non-fixed data is added to the allocation and release field of the data field 7A.

When its own processing is terminated, the data setting area allocation and release controller 29 informs the data add access controller 26 of termination of processing relating to data addition. As a result, the data add access controller 26 by executing the "DISK information feedback" program, registers the changed content of the data field 7A in the MM 7 relating to addition of data in the DISK feedback data table 18 as DISK feedback information, and notices the change of the held content in the MM 7 to the data MM/DISK feedback controller 20.

As a result, the data MM/DISK feedback controller 20 executes a DISK feedback program, and changes the held content in the DISK 8 on the basis of the DISK feedback information held in the DISK feedback data table 18. Thus, the held content of the data in the data field 7A of the MM 7, and the held content of the data in the data field 8A of the DISK 8 are matched.

According to the allocation operation of the data setting area described herein, each data setting area in the data field 7A is allocated or released by addition or deletion of data whenever necessary, but depending on the characteristic of the data, once the area is allocated, the area is not released thereafter in some data (fixed data). Such fixed data and other data (non-fixed data) allocated or released in the switching system operating are managed by separating the memory areas.

That is, the fixed data is allocated from the end of the data field in the sequence of request of allocation of data setting area (see FIG. 11). By contrast, the non-fixed data is allocated sequentially from the beginning of the data field 7A, by using the minimum address of each size of continuous empty areas in the data setting area management table 16.

At this time, if the "minimum address of each size of continuous empty areas" in the data setting area corresponding to the size of the non-fixed data is not registered in the data setting area management table 16, the size allocated or released most frequently in the data setting area is detected from the allocation release onset frequency statistic data of the data setting area, and the minimum address of each size of continuous empty areas is acquired about the sum of the size of the non-fixed data and the detected size, and the data is added to the data storage area corresponding to the acquired address (see FIG. 12).

(Data Relocation)

Figure 14:
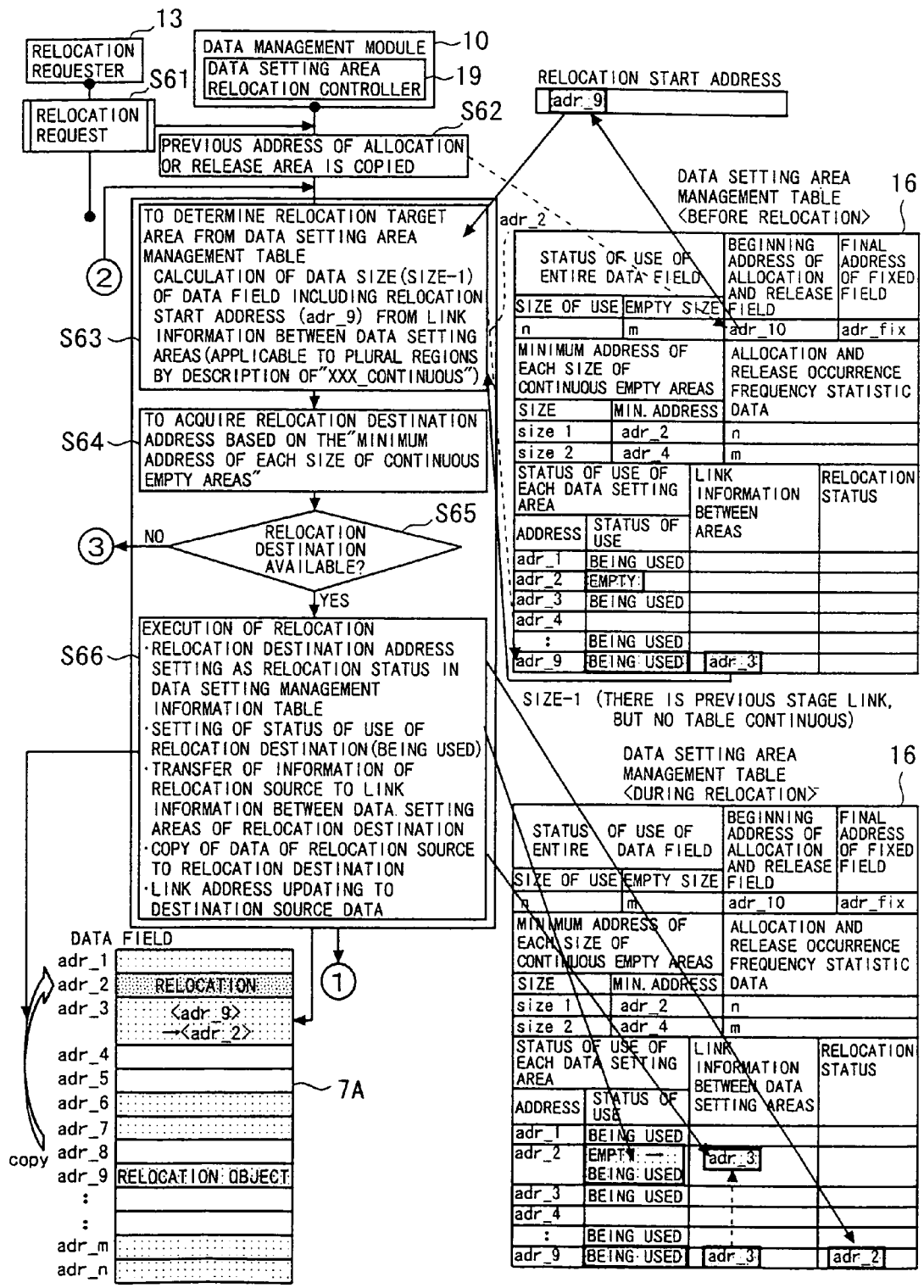
FIG. 14 is an explanatory diagram showing an example of a data relocating process executed by the data setting area relocation controller as shown in FIG. 2.
Figure 15:
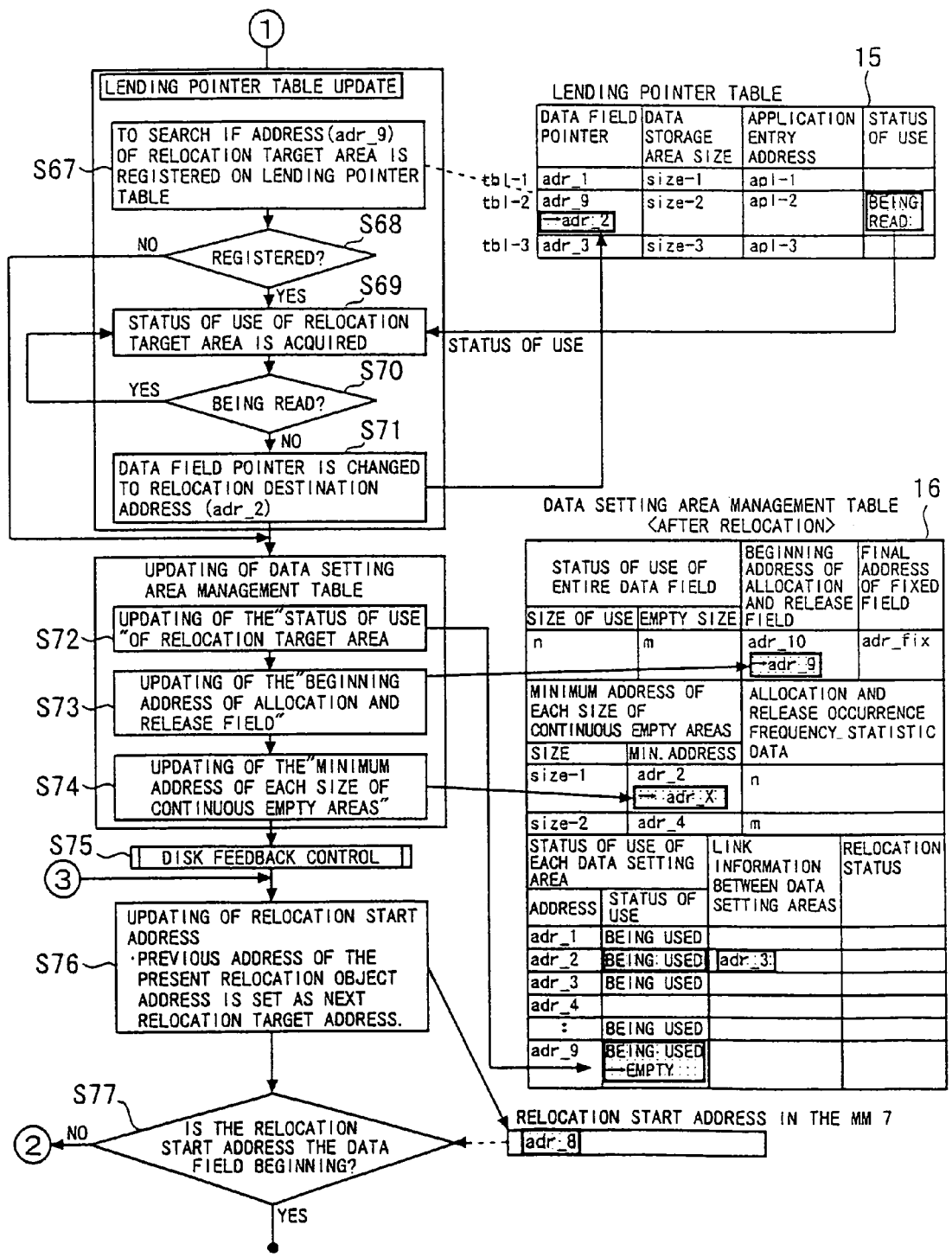
FIG. 15 is an explanatory diagram showing an example of the data relocating process.

The operation of data relocation by the data management module 10 is explained below. FIG. 14 and FIG. 15 are explanatory diagrams showing examples of operation of data relocation of the data management module 10.

In FIG. 14, when the data in the data field is relocated, the relocation requester 13 requests data relocation to the data setting area relocation controller 19 (S61). Then the data setting area relocation controller 19 copies "adr_9" which is one address before the beginning address (herein, adr_10) of the allocation and release field of the data field 7A in the MM 7 to other area, and sets this address as the relocation start address (S62).

Then, the data setting area relocation controller 19 executed a relocation target area decision program, and determines the relocation target area according to the content of the data setting area management table 16 (S63).

That is, the data setting area relocation controller 19 calculates the data size (for example, size-1) of the data including the relocation start address (for example, adr_9) from the link information between data setting areas. Herein, from the description of "xxx_continuous" held in the link information between data setting areas, the data storage area composed of plural data setting areas is the relocation target area.

The data setting area relocation controller 19 executes a relocation destination area decision program, and acquires the address of the relocation destination from the minimum address of each size of continuous empty areas of the table 16, by the same technique as shown in FIG. 13 (S64).

Further, the data setting area relocation controller 19 judges if the relocation destination is available or not (S65). At this time, if the relocation destination is not available, the operation goes to S76 shown in FIG. 15, and if the relocation destination is available, the operation goes to S66.

At S66, the data setting area relocation controller 19 executes a relocation program, and relocates the data. That is, the data setting area relocation controller 19 sets relocation destination address "adr_2" in the column of relocation status corresponding to the relocation start address "adr_9" of the data setting area management table 16.

In succession, the data setting area relocation controller 19 sets the status of use in the column corresponding to the relocation destination address "adr_2" of the table 16 to "being used" by changing from "empty". Then the data setting area relocation controller 19 transfers the relocation source address (adr_3) in the column of link information between data setting areas corresponding to the relocation destination address "adr_2".

Further, the data setting area relocation controller 19 copies the data held at the relocation source address "adr_9", and stores this copy in the relocation destination address "adr_2". The data setting area relocation controller 19 updates the link address to the address "adr_9" in the relocation target area in the data field indicated by the link information (adr_3) between data setting areas, to the relocation destination address "adr_2".

Next, the data setting area relocation controller 19 executes a lending pointer table update program, searches the lending pointer table 15 (S67), and judges if the record including the address "adr_9" in the relocation target area is registered or not (S68). At this time, if the corresponding record is registered, the operation goes to S68, and if not registered, the operation goes to step S72.

At S68, the data setting area relocation controller 19 acquires the "status of use" in the record, and judges if the "status of use" is "being read" or not (S70).

At this time, if the "status of use" is "being read", the operation goes back to S69, and the loop process between S69 and S70 is repeated until it is judged "NO" at S70, that is, until the "state of use" of "being read" is canceled. When judged "NO" at S70, the operation goes to S71.

At S71, the data setting area relocation controller 19 changes the value "adr_9" of the data field pointer in the record to the address "adr_2" at the relocation destination.

The data setting area relocation controller 19 now refers to the data setting area management table 16, and updates the status of use of the relocation target area "adr_9" (S72). Then, the data setting area relocation controller 19 updates the "beginning address of the allocation and release field" of the table 16 (S73). Next, the data setting area relocation controller 19 updates the "minimum address of each size of continuous empty areas" of the table 16 according to the process shown in FIG. 10 (S74).

Consequently, the data setting area relocation controller 19 executes a DISK feedback information setting program, registers the information about the relocation target area in the DISK feedback data table 18, and requests DISK feedback to the data MM/DISK feedback controller 20.

As a result, the data MM/DISK feedback controller 20 executes a DISK feedback program, and refers to the content (the information about the relocation) in the DISK feedback data table 18, and matches the held content in the DISK 8 with the MM 7 (DISK feedback control: S75).

Later, the data setting area relocation controller 19 updates the relocation start address (S76). That is, "adr_8" one address before the present relocation start address "adr_9" is set as the next relocation start address.

Further, the data setting area relocation controller 19 judges if the relocation start address is the beginning address of the data field of the MM 7 or not (S77), and if not the beginning address, the operation returns to S63 in FIG. 14, and the operation of S63 to S77 is executed. By contrast, when the relocation start address is the beginning address of the data field, the relocation operation is terminated.

According to the relocation operation explained so far, while the application program is reading out the pointer at the time of data relocation, the lending pointer table 15 is not updated until the reading process is finished. Therefore, even while the application program is directly reading by using the pointer, relocation can be executed as the maintenance and operating service, so that the content of the data being read out by the application program can be assured. Further, by the link information between the data setting areas, the relocated data field and the address link between the data setting areas in the link relation therewith can be matched in a short time.

(Pointer Lending During Relocation)

When the application program requests lending of pointer to the data management module 10, if the data setting area relating to this request is in the midst of relocation, the operation is explained in the following example.

Figure 16:
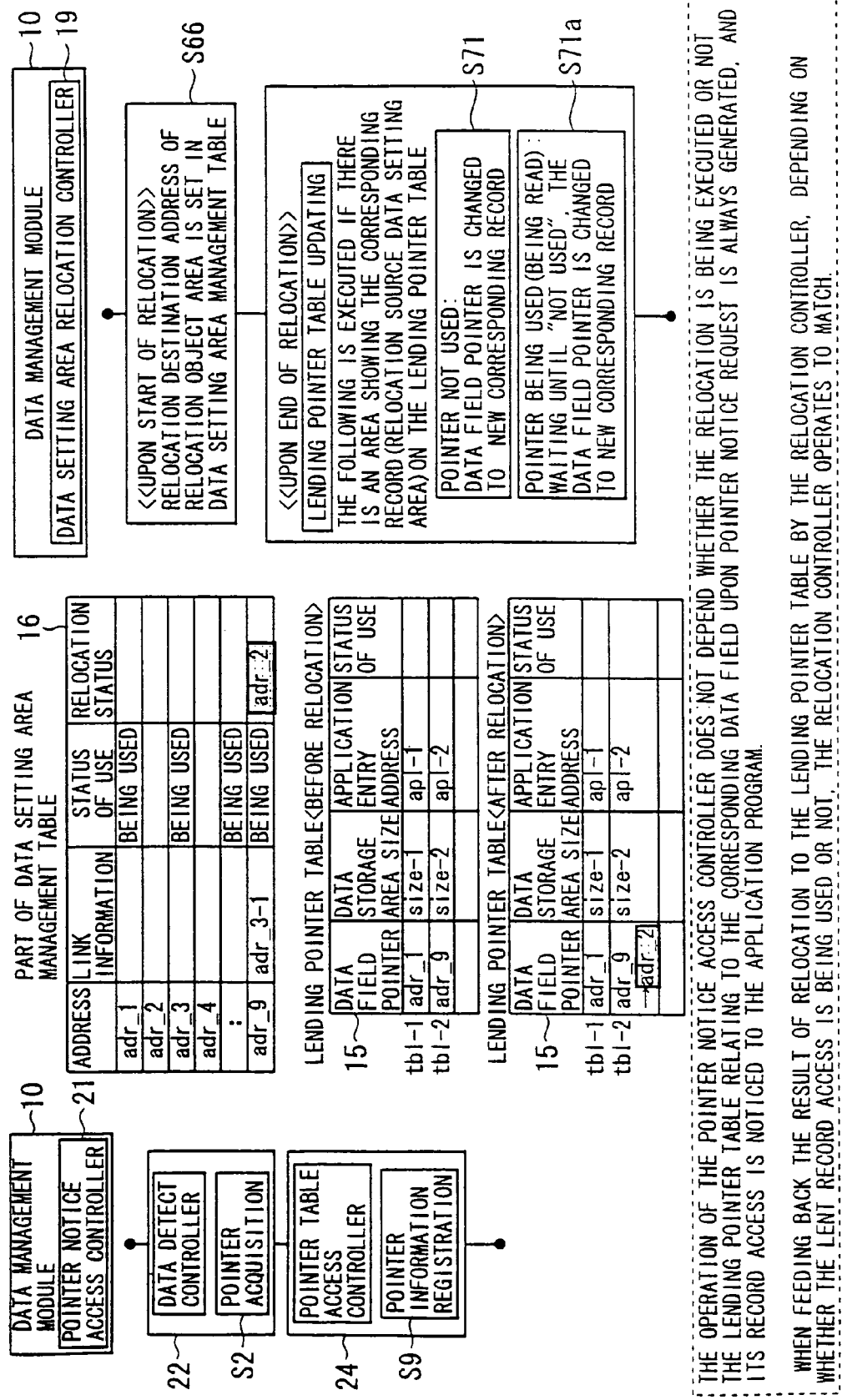
FIG. 16 is an explanatory diagram showing an example of updating of the lending pointer table executed by the pointer notice access controller in response to the data relocating process.

As shown in FIG. 16, for example, when the data setting area "adr_9" of the pointer lending target is set in "during relocation" in the data setting area management information table 16, the address "adr_9" in the data setting area before relocation is recorded in the data setting area pointer" of the lending pointer table 15 (S9), and the record (pointer) including this data setting pointer is lent to the application program.

On the other hand, the data setting area relocation controller 19 refers to the lending pointer table 15 during process of relocation of address. When a pointer record including the address "adr_9" is registered in the lending pointer table 15, the relocation controller 19 refers to the "status of use (use-condition)" of the pointer record. Then, if the "status of use" is "no-use", the relocation controller 19 changes the data field pointer "adr_9" of the pointer record into the data field pointer "adr_2". (S71). Accordingly, even during maintenance and operating service (relocation), the application program can read the data in the MM 7 by using the pointer being lent. On the other hand, if the "status of use" in the pointer record is "being read (on the read)", the relocation controller 19 waits the update process until that the reading process is finished (S71a).

(Pointer Invalidity Notice)

Figure 17:
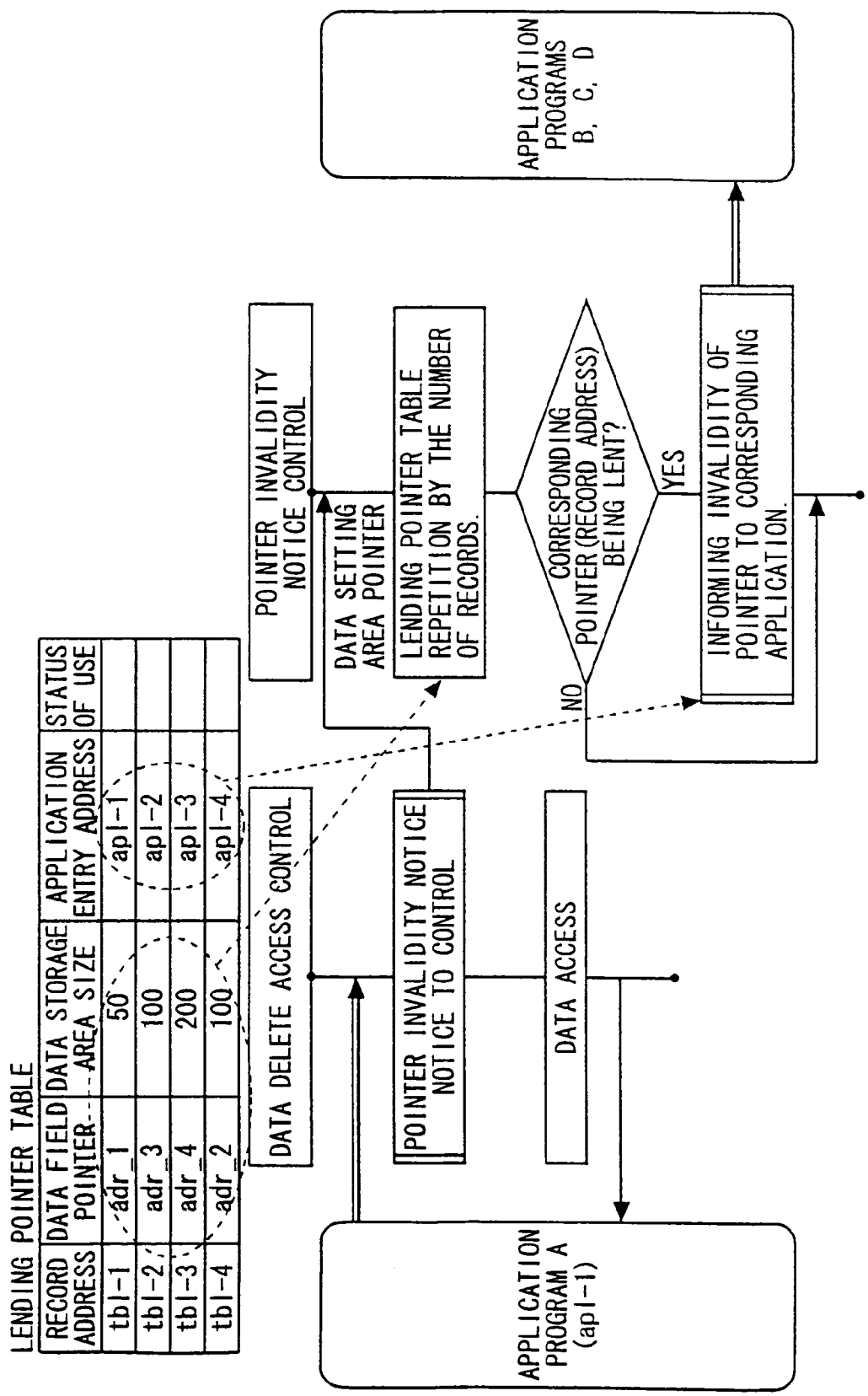
FIG. 17 is an explanatory diagram showing an example of a pointer invalidity notice process executed by the data access controller as shown in FIG. 2.
Figure 18:
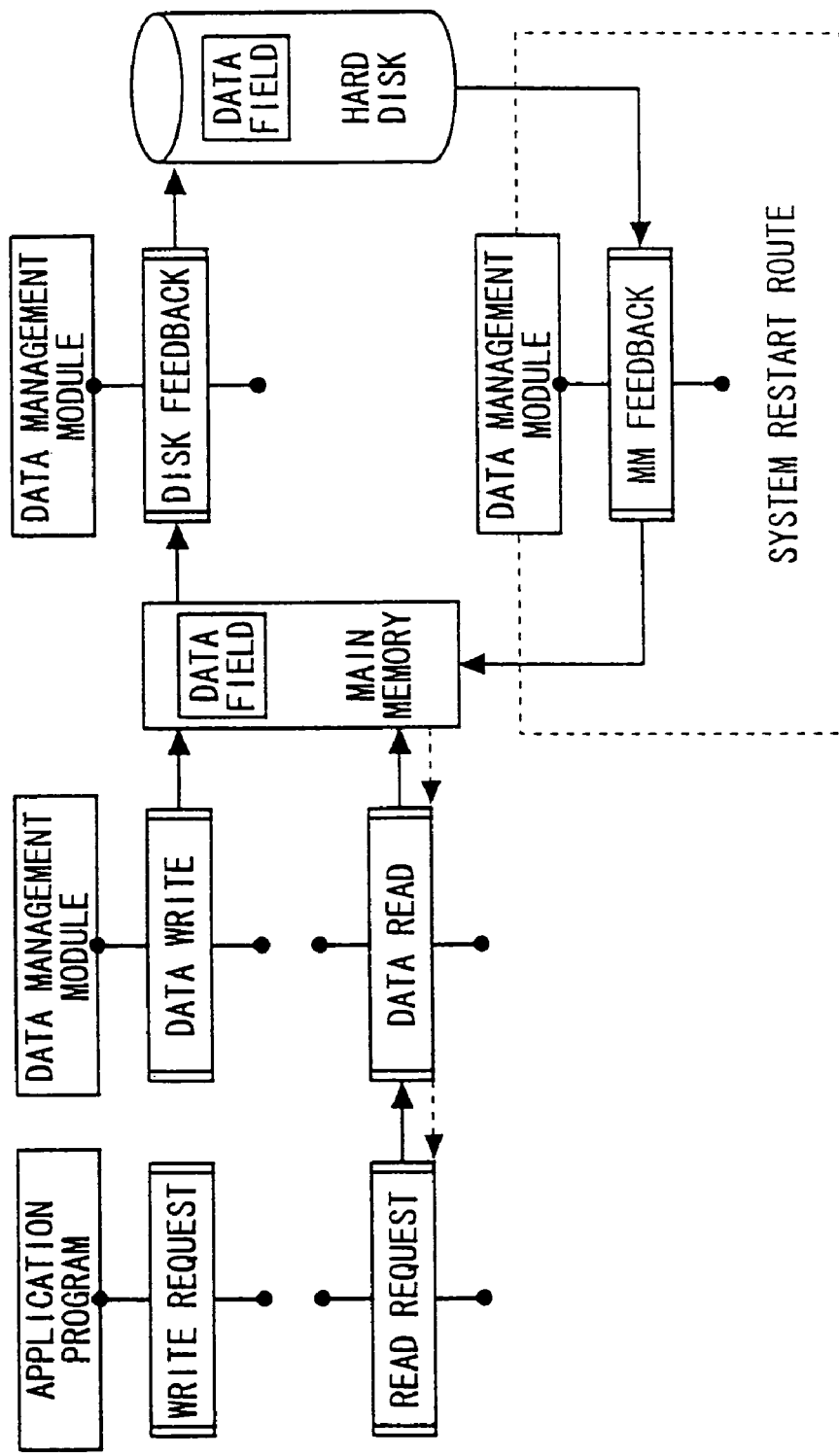
FIG. 18 is an explanatory diagram of a prior art showing data read/write processes from/to a main memory and a hard disk in a switching unit.
Figure 19:
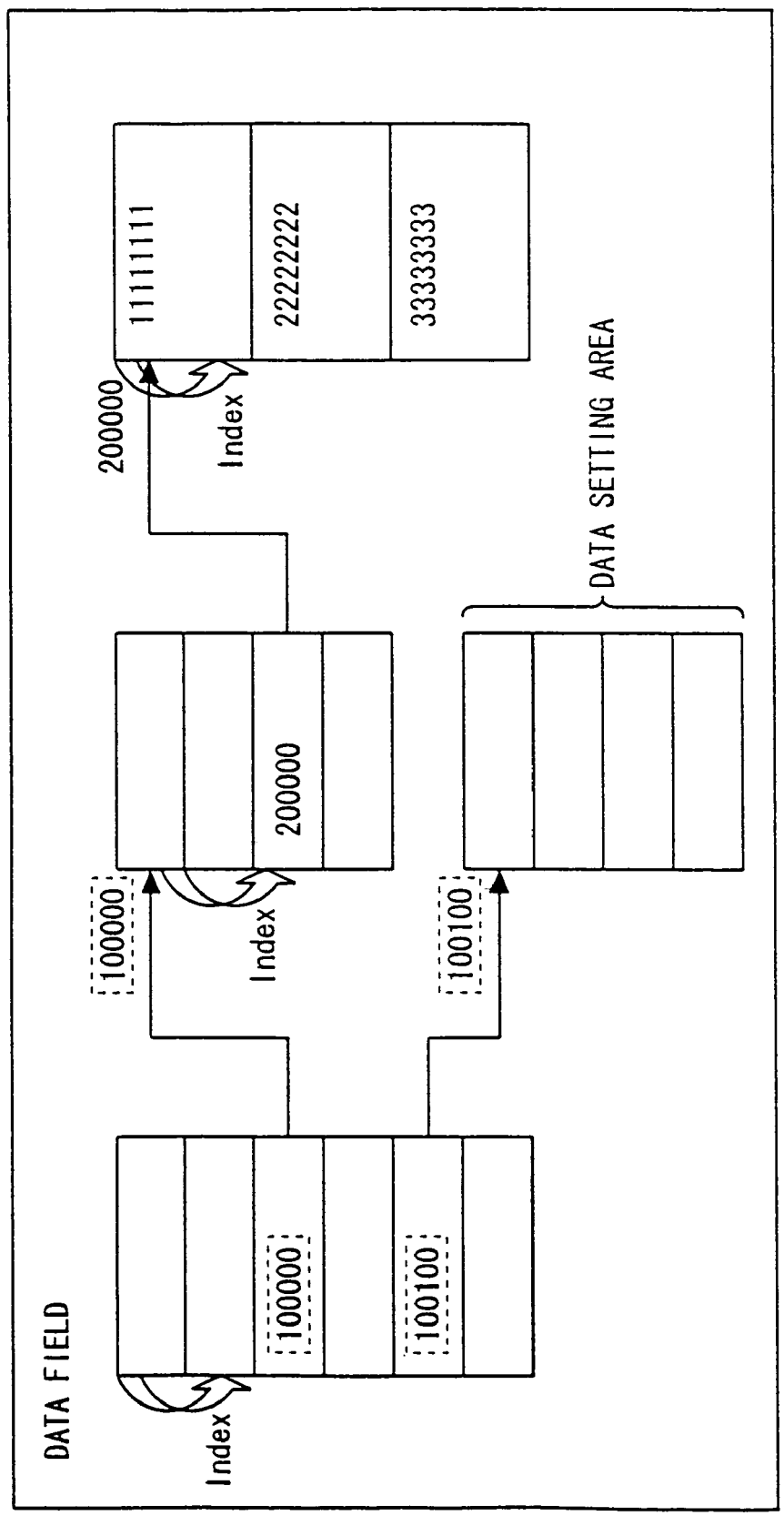
FIG. 19 is an explanatory diagram of a prior art showing the data read process from a data field.
Figure 20:
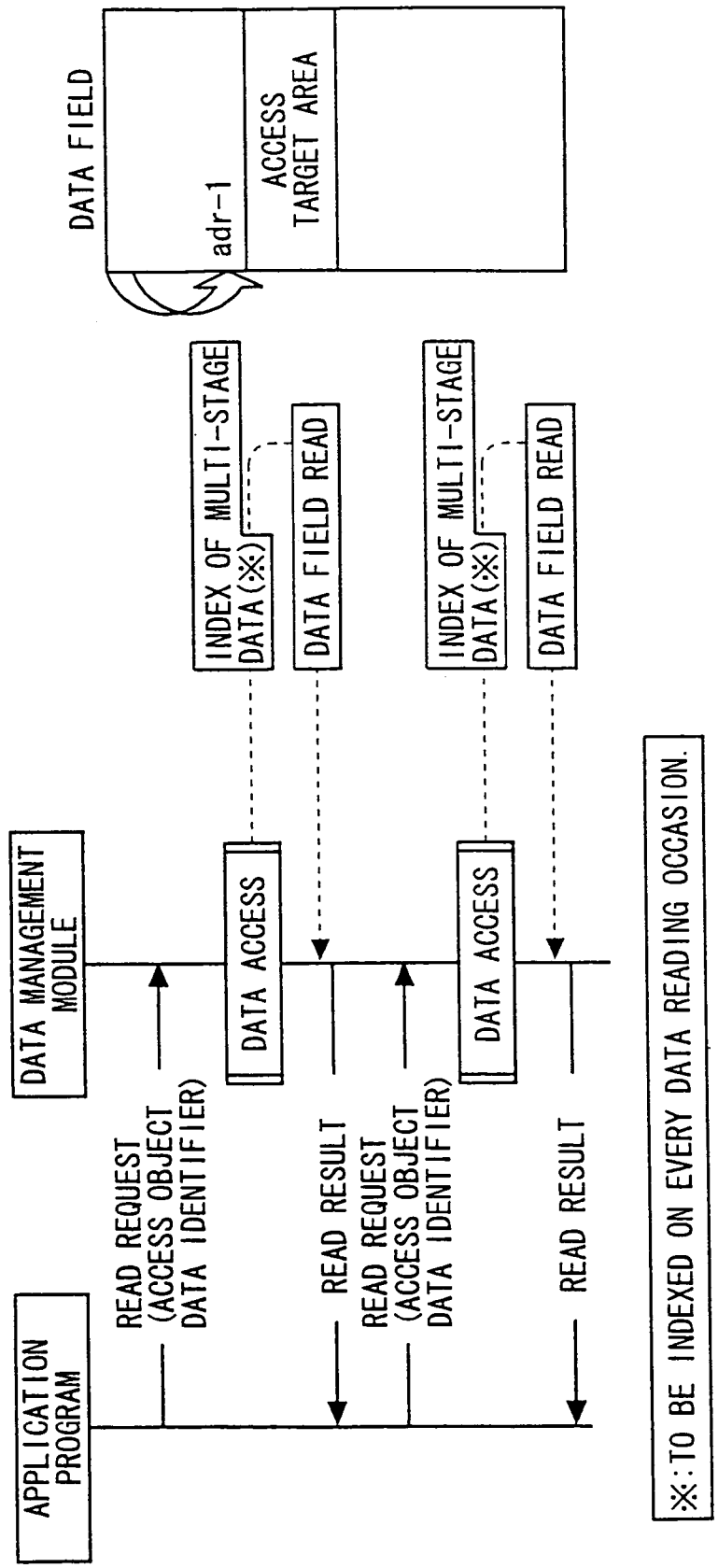
FIG. 20 is an explanatory diagram of a prior art shown a data read process of a data management module according to a read request from an application program.
Figure 21:
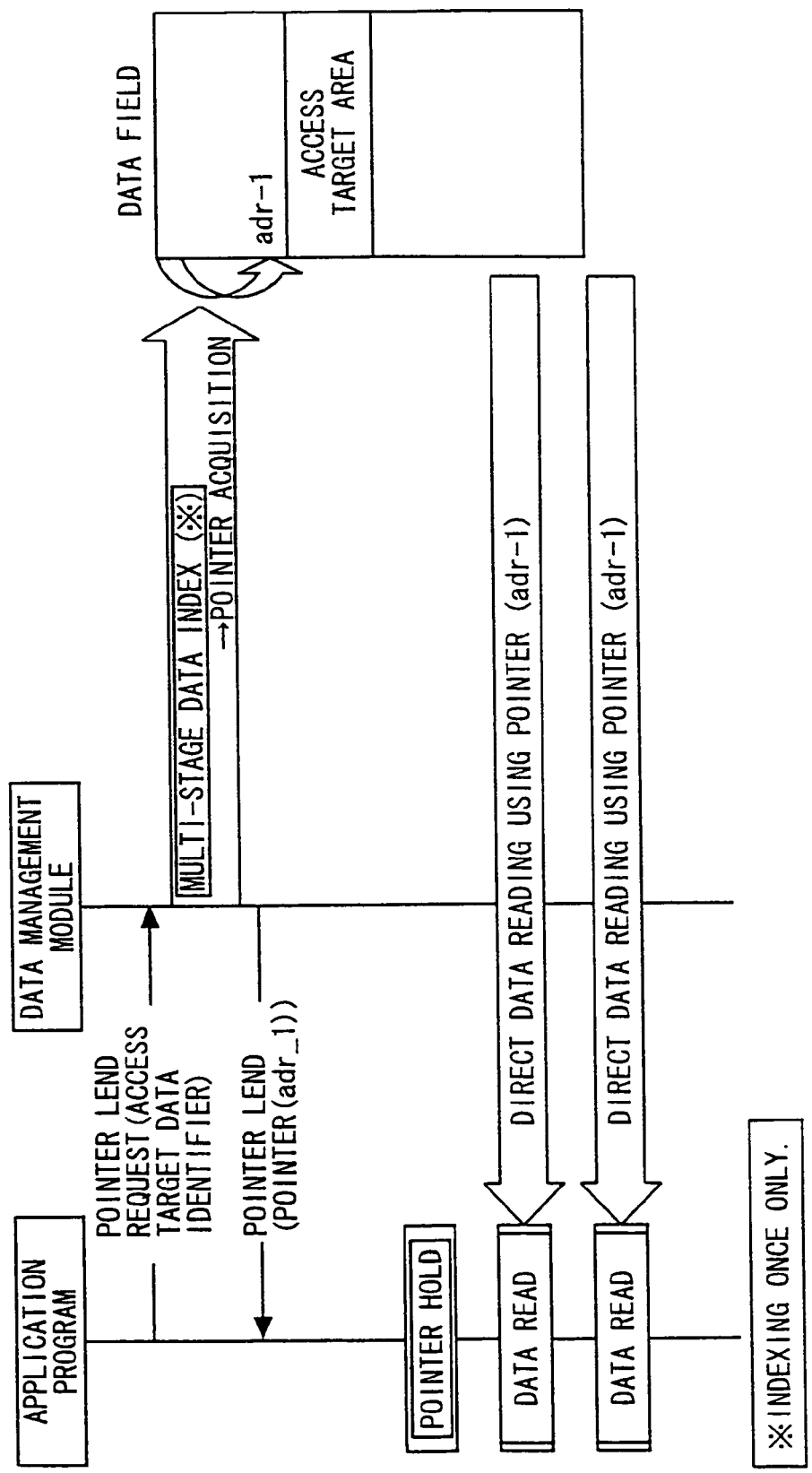
FIG. 21 is an explanatory diagram of a prior art showing a data read process (direct data reading) of an application program using a pointer posted from a data management module.

The operation of pointer invalidity notice is explained. FIG. 17 is an explanatory diagram of operation example of pointer invalidity notice by the data management module 10. As shown in FIG. 17, for example, when application program A in the application program group 11 requests deletion of data (release of data setting area) to the data management modules 10, the data setting area allocation and release controller 29 of the data management module 10 operates same as at S22 to S29 in FIG. 9. The data setting area allocation and release controller 29 informs the data setting area pointer (address) of which release is requested to the pointer invalidity notice controller 28.

The pointer invalidity notice controller 28 refers to the lending pointer table 15, and when the noticed data setting area pointer is registered in the lending pointer table 15, the invalidity of the pointer being lent is informed of the application programs corresponding to the application entry address on the lending pointer table 15 (in this example, application programs B to D in the application program group 11).

As a result, if the data setting area is released by a certain application program, it is possible to prevent reading of the data by using the data from the released data setting area by other application program.

(Operation of the Embodiment)

According to the data management module 10 of the embodiment, the direct address (data field pointer) in the data field hitherto noticed to the application program is held and managed by the lending pointer table 15 of the data management module 10.

When each application program reads out data from the data field 7A, the data management module 10 detects the direct address from the pointer noticed from the application program, and reads out the data from the direct address, and transfers to the application program. Therefore, each application program can acquire the desired data more quickly than when indexing the data link.

Moreover, since the data management module 10 manages the lending pointer table 15, if data relocation occurs about the data setting area while the pointer is being lent, the data field pointer can be changed depending on the status of use of the data setting area. Hence, it is not necessary to notice the pointer newly to the application program, and the application program is not required to have the knowledge of status of use of the data setting area.

Besides, the data management module 10 holds the data setting area management table 16, and the "beginning address of allocation and release field", the "ending address of fixed field", the "minimum address of each size of continuous empty areas", and the "allocation and release occurrence frequency statistic data" are held in this table 16, and they are referred to when the allocating process is executed, so that the search time of empty area (continuous empty area adjusted a size of data) can be shorter than in the prior art when a data is allocated in the data field 7A.

The "link information between data setting areas" is held in the table 16. When relocating the data, by referring to the "link information between data setting areas", reconstruction of the link between data setting areas after data relocation can be executed easily.

Besides, the "minimum address of each size of continuous empty areas", and the "allocation and release occurrence frequency statistic data" are held in this table 16, and they are referred to when allocating the data setting areas. Accordingly, the size of the unused area occurring in allocation of data setting area can be changed to the size of frequent occurrence of allocation and/or release of data setting area, and scattering of small areas not fit for allocation can be prevented.

Therefore, the data setting areas as the target of relocation can be curtailed, and the MM/DISK synchronous processing time (system-unstable-time) due to data MM/DISK feedback controller 20 can be shortened.

Further, when the data in the data field 7A is deleted, if there is a pointer record about the deleted data in the lending pointer table 15, the invalidity of the record pointer is informed (noticed) to the application program corresponding to the application entry address included in this pointer record. It hence avoids inappropriate access by the application program to the area made invalid in data access by the pointer, and the data access matching between the maintenance and operating service by the data management module 10 and the application program group 11 can be maintained.

According to the embodiment, in the switching system, without data indexing by the application program, the pointer for reading out the data from the data field 7A can be maintained and managed by the data management module 10. Accordingly, while maintaining the quality of reading data without drop of performance of application program, instant the data rewriting and the data relocation are possible in the maintenance and operating service.

Moreover, regarding to the embodiment, when the allocation process is executed, at least one of appropriate data setting areas in order to store the data to be allocate is detected, on the basis of the "frequency statistic data" in the data setting area management table 16. As a result, scattering of empty areas occurring in allocation or release of data can be minimized. Hence, the data to be relocated are less, and the time required for feeding back the relocation result on the MM 7 to the DISK 8 as the backup area is shorter, so that the system-unstable-time (a time of which the contents of the data field 7A and the contents of the data field 8A do not match) is shortened.

(Others)

The invention is an indispensable technique for realizing data relocation function expected in the future, without having adverse effects on the performance and quality of exchange service, in the switching system for holding data in a wide variety and in a large quantity, being used continuously for a long period (data addition, deletion, reading) since the installation of initial data.

The embodiment also allocates and releases the data setting area and accumulates the information (collection of onset frequency in every size of allocation and release field) during operation of the switching system, and applies the information in the data setting area allocation and relocation function. As a result, an efficient data setting area management having different data setting features in every switching system operating exchange office is realized.

In the switching system operation of heavy traffic day and night owing to global data communications linking every city and town around the world, without giving consideration to the data access frequency, and without having limits in the data access or time zone by the maintenance and operating service, the data reading and data setting area management (allocation, release and relocation of the data setting areas being in operation) can be executed instantly upon request. In this respect, the effects seems outstanding in the future operation of switching system.

Further according to the embodiment, while the exchange service is diversified, new service can be executed without interrupting the existing service, and data can be added for the new service without limits in the memory allocation, and it is expected to be the core technology in the data management function of switching system.

What is claimed is:

1. A data management apparatus for managing data used when executing an application program stored on a computer readable recording medium, said data management apparatus included in a switching system for providing services related to communication, comprising:

a data field for storing the data, wherein the data field is composed of a plurality of data setting areas, and the data is stored in a single or plural data setting areas according to a size of the data;

an address acquirer for acquiring an address in said data field of the data for which an access is requested by the application program when receiving a pointer lending request from the application program;

a lending pointer table for storing at least one of the pointer records, each of which has the acquired address and a pointer corresponding to the acquired address, the pointer indicating an address of the pointer record;

a lender for informing the application program of the pointer corresponding to the acquired address when the acquired address is registered in the lending pointer to lend the read pointer to the application program;

an allocation controller for determining, when the application program requests to add data to the field, if the data field has a first empty area that exists between the data setting areas each having a state of in-use and is composed of a single or plural continuous data setting areas, each of which has a state of unused, having a size equal to or larger than a size of the data to be added, to store the data to be added in the first empty area;

an adder for storing the data to be added in the data field according to a determining result of the allocation controller; and a data setting area management table to register use-condition of each of the data setting areas, an address of the first empty area and an address of a second empty area, each corresponding to the size of the respective empty area, the data setting area management table being referred to the allocation controller to determine a storing position for the data to be added.

2. A data management apparatus according to claim 1, further comprising:

a reader for reading out, when receiving the lent pointer from the application program, reading out the address corresponding to the lent pointer from the lending pointer table, reading out the data stored in said data field according to the read address, and giving the read data to the application program, wherein the address stored in the pointer record is changed into an address of a relocation destination in the data field in response to relocation of the data stored in the data field.

3. A data management apparatus according to claim 2, further comprising:

a deleter for deleting the data to be deleted from said data field according to a deleting request from the application program; and a record deleter deleting the pointer record having the address in said data field of the data which is deleted by said deleter, from said lending pointer table.

4. A data management apparatus according to claim 3, further comprising:

an invalidity informer for informing the application program of invalidation of the lent pointer when the record deleter deletes the pointer record having the lent pointer.

5. A data management apparatus according to claim 2, further comprising:

a relocater for relocating the data stored in said data field when receiving a relocation request; and an address updater for detecting the pointer record having the address in said data field of the data that is relocated by the relocater, from the lending pointer table, and updating the address in said data field stored in the detected pointer record according to a result of relocation of the relocater.

6. A data management apparatus according to claim 5, wherein said address updater, when said reader is reading out the data from said data field on the basis of the address of said data field stored in the pointer record, waits the updating process of the address in the pointer record until said reader finishes the reading process.

7. A data management apparatus according to claim 1, further comprising:

a record deleter, when receiving a notification indicating that the application program does not use the lent pointer from the application program, deleting the pointer record having the lent pointer from said lending pointer table.

8. A data management apparatus according to claim 1, wherein:

said address acquirer, when acquiring the address, refers to said data setting area management table, and detects the use-condition of the data setting area corresponding to the acquired address from said data setting area management table; and said lender, when the detected use-condition is under the condition of deletion of data, informs the application program that there is no data for which an access is requested by the application program.

9. A data management apparatus according to claim 1, wherein when data is stored in a plurality of data setting areas in the data filed by the adder, link information related to at least one of the links between the plurality of data setting areas is stored in the data setting area management table, wherein the link information indicates a connection relationship of the plurality of data setting areas.

10. A data management apparatus according to claim 1, wherein said data setting area management table, when a data stored in a data setting area is relocated to another data setting area by the relocater, the relocater stores, in the data setting area management table, relocation condition information including information indicating the data setting area being a relocation destination of the data that is relocated.

11. A data management apparatus according to claim 1, wherein a single or plural data setting areas compose a data storage area for storing data;

a size of the data storage area is defined depending on the number of data setting areas for composing the data storage area;

said data setting area management table holds frequency data summing up a number of times of allocation of data into the data setting area generated by addition of data and a number of times of release of data setting area generated by deletion of data, according to the size of the data storage area; and said allocation controller, when said data field has at least one of continuous empty areas and there is no continuous empty area which meets a size of data requested to be added, determines at least one of data setting areas for storing the data requested to be added on the basis of the frequency data, wherein said allocation controller determines the at least one of data setting areas so that a continuous empty area with the size that the sum of allocation/release times indicated by the frequency data is a maximum is generated through the data allocation.

12. A method for managing data used when executing an application program included in a switching system for providing services related to communication, comprising the steps of:

storing the data in a data field, wherein the data field is composed of a plurality of data setting areas, data is stored in a single or plural data setting areas according to a size of the data;

acquiring an address in the data field of the data for which an access is requested by the application program when receiving a pointer lending request from the application program;

storing at least one of the pointer records, each of which has the acquired address and a pointer corresponding to the acquired address, in a lending pointer table, the pointer indicating an address of the pointer record;

informing the application program of the pointer corresponding to the acquired address when the acquired address is registered in the lending pointer table to lend the read pointer to the application program;

determining, when the application program requests to add data to the data field, if the data field has a first empty area that exists between the data setting areas each having a state of in-use and is composed of a single or plural continuous data setting areas, each of which has a state of unused, having a size equal to or larger than a size of the data to be added, to store the data to be added in the first empty area;

storing the data to be added in the data field according to a determining result of the allocation controller; and registering use-condition of each of the data setting areas, an address of the first empty area and an address of a second empty area, each corresponding to the size of the respective empty area, the data setting area management table being referred to the allocation controller to determine a storing position for the data to be added.

13. A method according to claim 12, further comprising steps of:

receiving the lent pointer from the application program;

reading out the address corresponding to the lent pointer from the lending pointer table;

reading out the data stored in the data field according to the read address; and giving the read data to the application program, wherein the address stored in the pointer record is changed into an address of a relocation destination in the data field in response to relocation of the data stored in the data field.

14. A computer readable medium storing a program for managing data used when executing an application program included in a switching system for providing services related to communication, the program comprising instructions that when executed on a computer perform the steps of:

storing data in a data field, wherein the data field is composed of a plurality of data setting areas, data is stored in a single or plural data setting areas according to a size of the data;

acquiring an address in the data field of the data in which an access is requested by the application program when receiving a pointer lending request from the application program;

storing at least one of the pointer records, each of which has the acquired address and a pointer corresponding to the acquired address in a lending pointer table, the pointer indicating an address of the pointer record;

informing the application program of the pointer corresponding to the acquired address when the acquired address is registered in the lending pointer table to lend the read pointer to the application program;

determining, when the application program requests to add to the data field, if the data field has a first empty area that exists between the data setting areas each having a state of in-use and is composed of a single or plural continuous data setting areas, each of which has a state of unused, having a size equal to or larger than the size of the data to be added, to store the data to be added in the first empty area;

storing the data to be added in the data field according to a determining result of the allocation controller; and registering use-condition of each of the data setting areas, an address of the first empty area and an address of a second empty area, each corresponding to the size of the respective empty area, the data setting area management table being referred to the allocation controller to determine a storing position for the data to be added.

15. A computer readable medium according to claim 14, wherein the program further comprising instructions that when executed on a computer perform the steps of:

receiving the lent pointer from the application program;

reading out the address corresponding to the lent pointer from the lending pointer table;

reading out the data stored in said data field according to the read address; and giving the read data to the application program, wherein the address stored in the pointer record is changed into an address of a relocation destination in the data field in response to relocation of the data stored in the data field.

* * * * *